United States Patent [19]

Izumi et al.

[11] Patent Number: 5,467,367
[45] Date of Patent: Nov. 14, 1995

[54] SPREAD SPECTRUM COMMUNICATION APPARATUS AND TELEPHONE EXCHANGE SYSTEM

[75] Inventors: Michihiro Izumi, Kawasaki; Kazunari Watanabe, Yokohama, both of Japan

[73] Assignee: Canon Kabushiki Kaisha, Tokyo, Japan

[21] Appl. No.: 259,122

[22] Filed: Jun. 13, 1994

Related U.S. Application Data

[63] Continuation of Ser. No. 892,273, Jun. 2, 1992, abandoned.

[30] Foreign Application Priority Data

Jun. 7, 1991 [JP] Japan ................................. 3-136520
Jun. 7, 1991 [JP] Japan ................................. 3-136521
Jun. 7, 1991 [JP] Japan ................................. 3-136527

[51] Int. Cl.⁶ ......................................... H04B 1/707
[52] U.S. Cl. .................. 375/206; 375/200; 375/205; 370/18; 380/34; 379/219; 379/220; 379/258; 379/268
[58] Field of Search ......................... 375/200–210; 370/18; 380/31, 33, 34; 379/219, 220, 258, 268

[56] References Cited

U.S. PATENT DOCUMENTS

| | | | |
|---|---|---|---|
| 4,225,935 | 9/1980 | Zscheile, Jr. et al. | 375/1 X |
| 4,308,617 | 12/1981 | German, Jr. | 375/1 |
| 4,392,220 | 7/1983 | Hirosaki et al. | 370/18 |
| 4,494,238 | 1/1985 | Groth, Jr. | 375/1 |
| 4,635,274 | 1/1987 | Kubota et al. | 375/1 |
| 4,672,629 | 6/1987 | Beier | 375/1 |
| 4,759,034 | 7/1988 | Nagazumi | 375/1 |
| 4,969,159 | 11/1990 | Belcher et al. | 375/1 |
| 5,204,877 | 4/1993 | Endo et al. | 375/1 |

*Primary Examiner*—Bernarr E. Gregory
*Attorney, Agent, or Firm*—Fitzpatrick, Cella, Harper & Scinto

[57] ABSTRACT

A telephone exchange system of this invention has a terminal connected to an extension by radio. As a radio communication modulation method, a spread spectrum method is used. A speech signal received from a line by the telephone exchange system is exchanged by an exchange switch, and is supplied to a data conversion unit. The data conversion unit causes a serial/parallel converter to covert a serial input signal into a parallel signal. The converted parallel signal is subjected to spread-spectrum modulation in units of parallel bits. The modulated signal bits are added to each other by an adder, and the sum signal is multiplexed on a carrier signal. The multiplexed signal is transmitted to the terminal. Upon reception of the signal, the terminal causes a phase synchronization circuit to generate an inverse spread code corresponding to a spread code, and synchronized with the reception signal, and inversely spreads the reception signal using the generated inverse spread code. The inversely spread signal is converted into a serial signal by a parallel/serial converter, i.e., is demodulated into a speech signal. When a signal is transmitted from the terminal, the said procedure as described above is executed in the opposite direction.

38 Claims, 23 Drawing Sheets

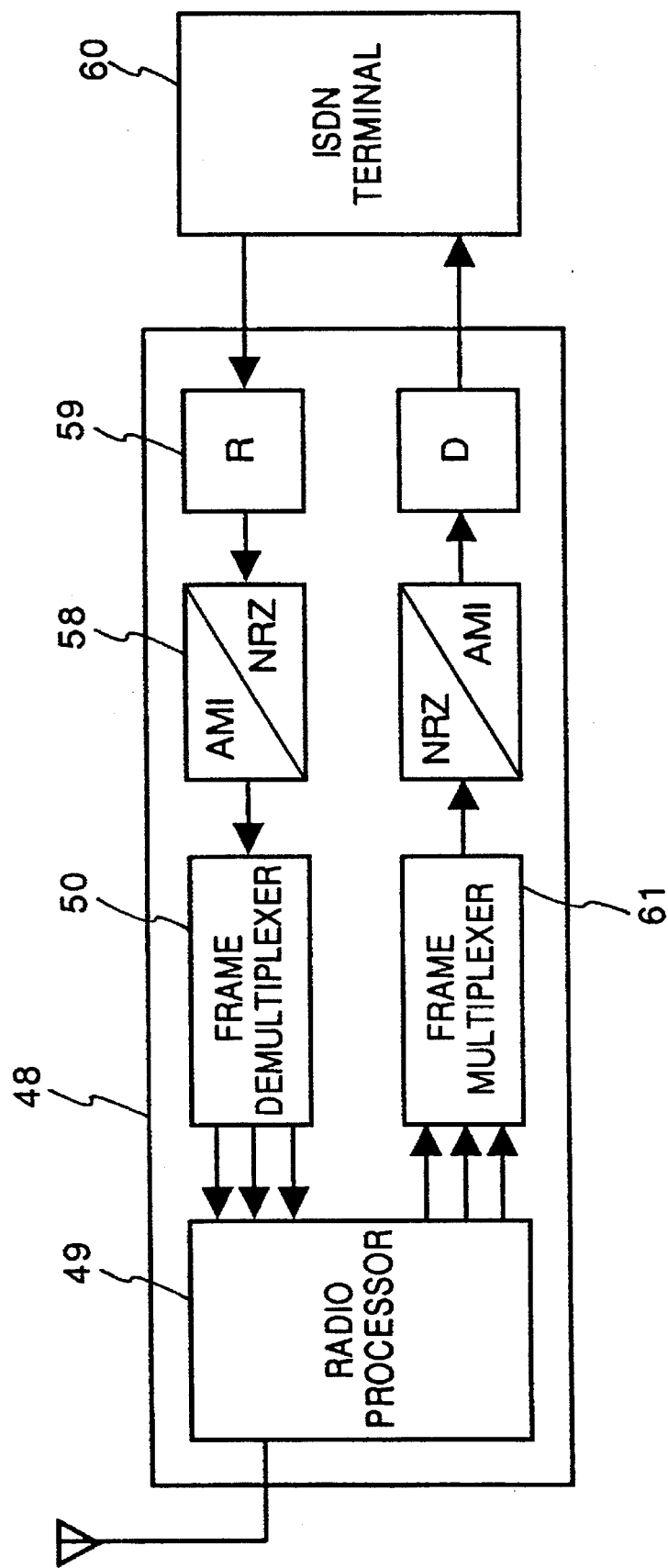
F I G. 6B

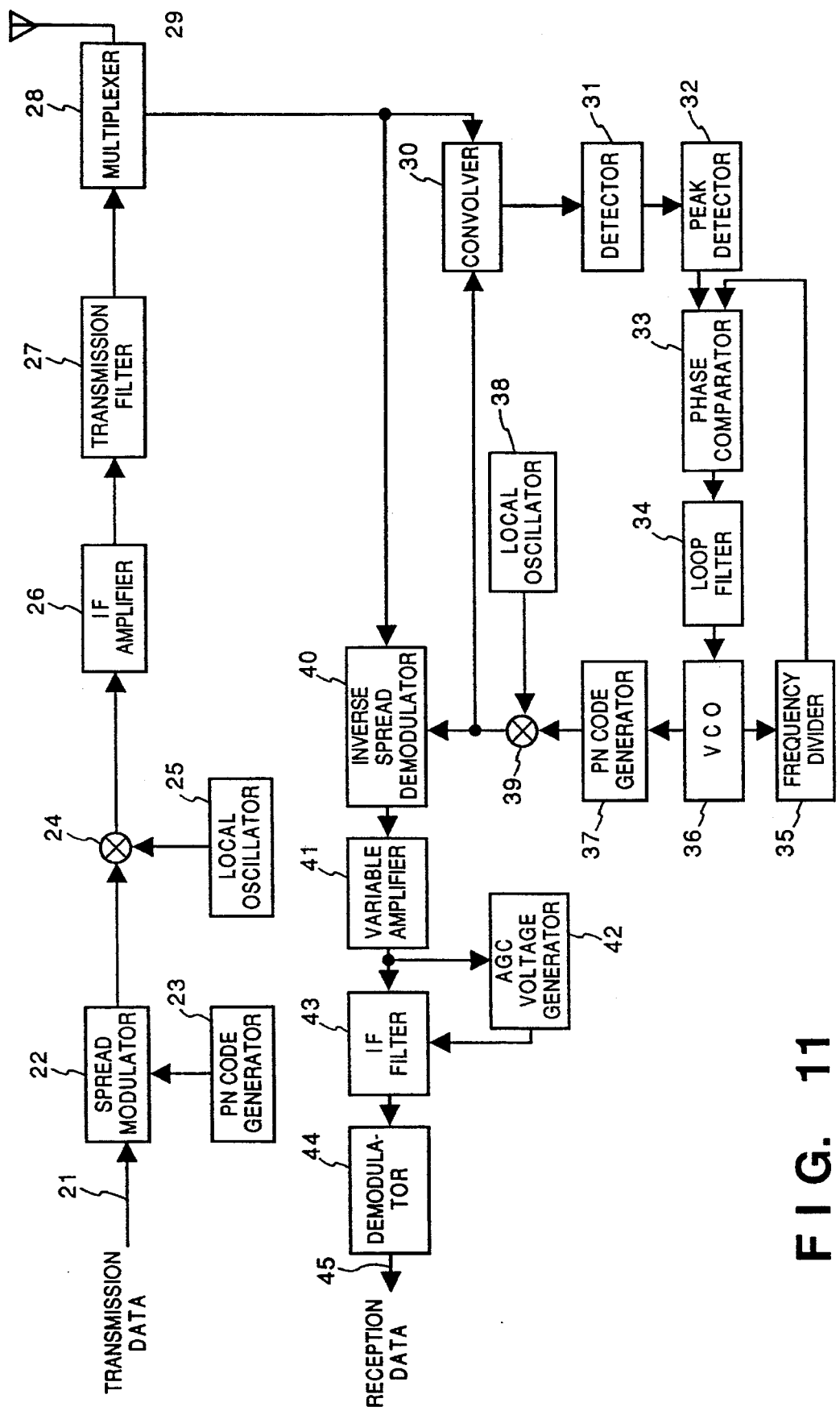
F I G. 11

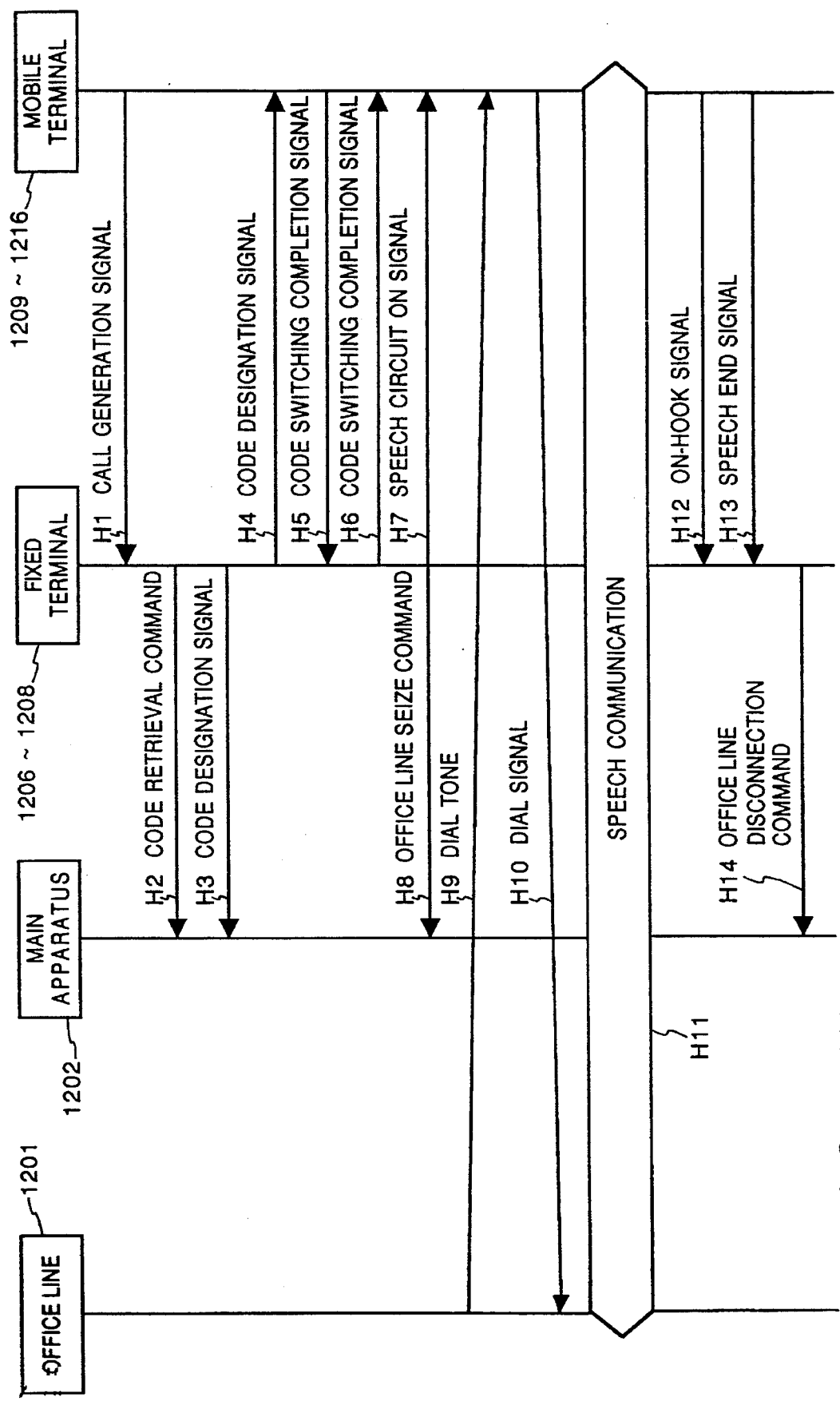
F I G. 17

SPREAD SPECTRUM COMMUNICATION APPARATUS AND TELEPHONE EXCHANGE SYSTEM

This application is a continuation of application Ser. No. 07/892,273 filed Jun. 2, 1992, now abandoned.

BACKGROUND OF THE INVENTION

1. Field of the Invention

The present invention relates to a spread spectrum communication apparatus and a telephone exchange system for performing communications through radio channels.

2. Description of the Prior Art

Conventionally, as a communication system capable of attaining a multiple access based on code division, a spread spectrum communication is known. In the spread spectrum communication, a transmitter converts a baseband signal to be transmitted into a baseband signal having a larger band width than that of original data based on a PN (Pseudo Noise) code having a sufficiently larger spectral width than that of the baseband signal to be transmitted. Furthermore, the transmitter modulates the converted signal based on, e.g., PSK (Phase Shift Keying) or FSK (Frequency Shift Keying) to form a high-frequency signal, and transmits the high-frequency signal.

However, the conventional spread spectrum communication suffers from a low data transmission speed since data is serially transmitted.

A conventional telephone exchange system performs an extension communication by radio based on FM (Frequency Modulation). Another conventional apparatus performs a data communication by radio based on PSK.

FIG. 21 shows the arrangement of a data conversion apparatus in a conventional telephone exchange system.

A case will be described below with reference to FIG. 21 wherein a conventional speech communication is performed. When speech data input from an exchange controller to a data conversion apparatus is to be transmitted, speech data, i.e., transmission baseband data 171 is mixed with an output signal from a transmission local oscillator 173 by a mixer 172 so as to be FM-modulated. The intermediate frequency of the output signal from the mixer 172 is amplified by an IF (Intermediate Frequency) amplifier 174, and the amplified signal is then filtered by a transmission filter 175. The filtered signal is input to a multiplexer 176, and is then transmitted from an antenna 177. A carrier wave upon modulation is assigned in units of 12.5 kHz, and an FM modulation factor is designed so that an occupied frequency after modulation does not exceed 12.5 kHz.

When an FM signal is to be received, an FM signal received at the antenna 177 is input to a mixer 179 through the multiplexer 176, and is mixed with an output signal from a reception local oscillator 178. Thereafter, the mixed signal is amplified by an IF amplifier 180, and the amplified signal is demodulated by a demodulator 181 into a baseband data output.

However, in the above-mentioned radio data communication, a high-speed data communication cannot be performed due to a problem of a limited use frequency band. More specifically, when there are a plurality of users, carrier waves of respective channels are set to have different frequencies to prevent interference among users, and at the same time, the use frequency band of each channel is limited. Therefore, when a high-speed data communication is performed, a spurious signal is generated. Thus, a simultaneous communication by a plurality of users suffers from a problem about frequency utilization.

When a very weak radiowave is utilized to solve the problem about frequency utilization, a transmission distance is undesirably shortened.

SUMMARY OF THE INVENTION

The present invention has been made to solve the above problem, and has as its object to provide a spread spectrum communication apparatus, which can increase a data transmission speed.

It is another object of the present invention to provide a spread spectrum communication apparatus comprising generation means for parallelly generating a plurality of different spread codes, modulation means for modulating transmission information signals of a plurality of parallel channels using the plurality of spread codes generated by the generation means, respectively, accumulation means for accumulating the signals of the channels modulated by the modulation means, and transmission means for transmitting a signal accumulated by the accumulation means.

It is still another object of the present invention to provide a spread spectrum communication apparatus comprising generation means for parallelly generating a plurality of different inverse spread codes, and modulation means for parallelly modulating reception signals using the plurality of inverse spread codes generated by the generation means, respectively.

It is still another object of the present invention to provide a spread spectrum transmission apparatus comprising generation means for generating a plurality of spread codes, a plurality of spread means for spreading transmission information on the basis of the plurality of spread codes generated by the generation means, and supply means for supplying bits of the transmission information consisting of a plurality of bits to the plurality of spread means.

It is still another object of the present invention to provide a spread spectrum reception apparatus comprising generation means for generating a plurality of inverse spread codes, a plurality of inverse spread means for performing inverse spread on the basis of the plurality of inverse spread codes generated by the generation means, and supply means for parallelly supplying a reception signal to the plurality of inverse spread means.

It is still another object of the present invention to provide a spread spectrum communication apparatus comprising first generation means for generating a first spread code, a plurality of delay means for delaying the first spread code to generate a plurality of spread codes having different phases, modulation means for modulating transmission information signals of a plurality of parallel channels using the plurality of spread codes generated by the first generation means, accumulation means for accumulating the signals of the channels modulated by the modulation means, second generation means for generating a second spread code, multiplication means for multiplying a signal accumulated by the accumulation means with the second spread code generated by the second generation means, and transmission means for transmitting the signal multiplied by the multiplication means.

It is still another object of the present invention to provide a spread spectrum communication apparatus comprising first generation means for generating a first inverse spread code, second generation means for generating a second inverse spread code, correlation means for checking a correlation between the second inverse spread code and a reception signal, third generation means for delaying the first inverse spread code according to the correlation between the second inverse spread code and the reception signal to generate a plurality of inverse spread codes having different phases, and modulation means for parallelly modulating the reception signal using the plurality of inverse spread codes generated by the third generation means.

It is still another object of the present invention to provide a telephone exchange system having an extension connected by radio, comprising reception means for receiving a signal from a terminal, demodulation means for inversely spreading the signal received by the reception means to demodulate the signal into a speech signal, exchange means for exchanging the speech signal demodulated by the demodulation means, and control means for controlling the exchange means on the basis of the signal received by the reception means.

It is still another object of the present invention to provide a telephone exchange system having an extension connected by radio, comprising exchange means for exchanging a speech signal, spread means for spreading the speech signal exchanged by the exchange means, and transmission means for transmitting the signal spread by the spread means to a terminal.

It is still another object of the present invention to provide a telephone exchange system having an extension connected by radio, comprising reception means for receiving a signal, demodulation means for inversely spreading the signal received by the reception means to demodulate the signal into a speech signal, exchange means for exchanging the speech signal, control means for controlling the exchange means on the basis of the signal received by the reception means, spread means for spreading the speech signal exchanged by the exchange means, and transmission means for transmitting the signal spread by the spread means.

It is still another object of the present invention to provide a telephone exchange system connected to a plurality of mobile terminals by radio, comprising selection means for selecting one of a plurality of spread codes, information means for informing the spread code selected by the selection means to the mobile terminals by radio, and demodulation means for inversely spreading the signal from the mobile terminals informed by the information means in accordance with the spread code selected by selection means to demodulate the signal into a speech signal.

It is still another object of the present invention to provide a telephone exchange system connected to a plurality of mobile terminals by radio, comprising selection means for selecting one of a plurality of spread codes, exchange means for exchanging a speech signal, modulation means for modulating the speech signal exchanged by the exchange means in accordance with the spread code selected by the selection means, and transmission means for transmitting the signal modulated by the modulation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6B is a block diagram showing the arrangement of an extension terminal connected to the telephone exchange system of the third embodiment;

FIG. 11 is a block diagram showing the arrangement of a data conversion apparatus in a telephone exchange system according to the fifth embodiment of the present invention;

FIG. 17 is a call generation sequence chart of the telephone exchange system of the sixth embodiment;

DESCRIPTION OF THE PREFERRED EMBODIMENTS

[First Embodiment (FIGS. 1, 2, and 3)]

The first embodiment of the present invention is a telephone exchange system utilizing a spread spectrum communication.

Figure 1:
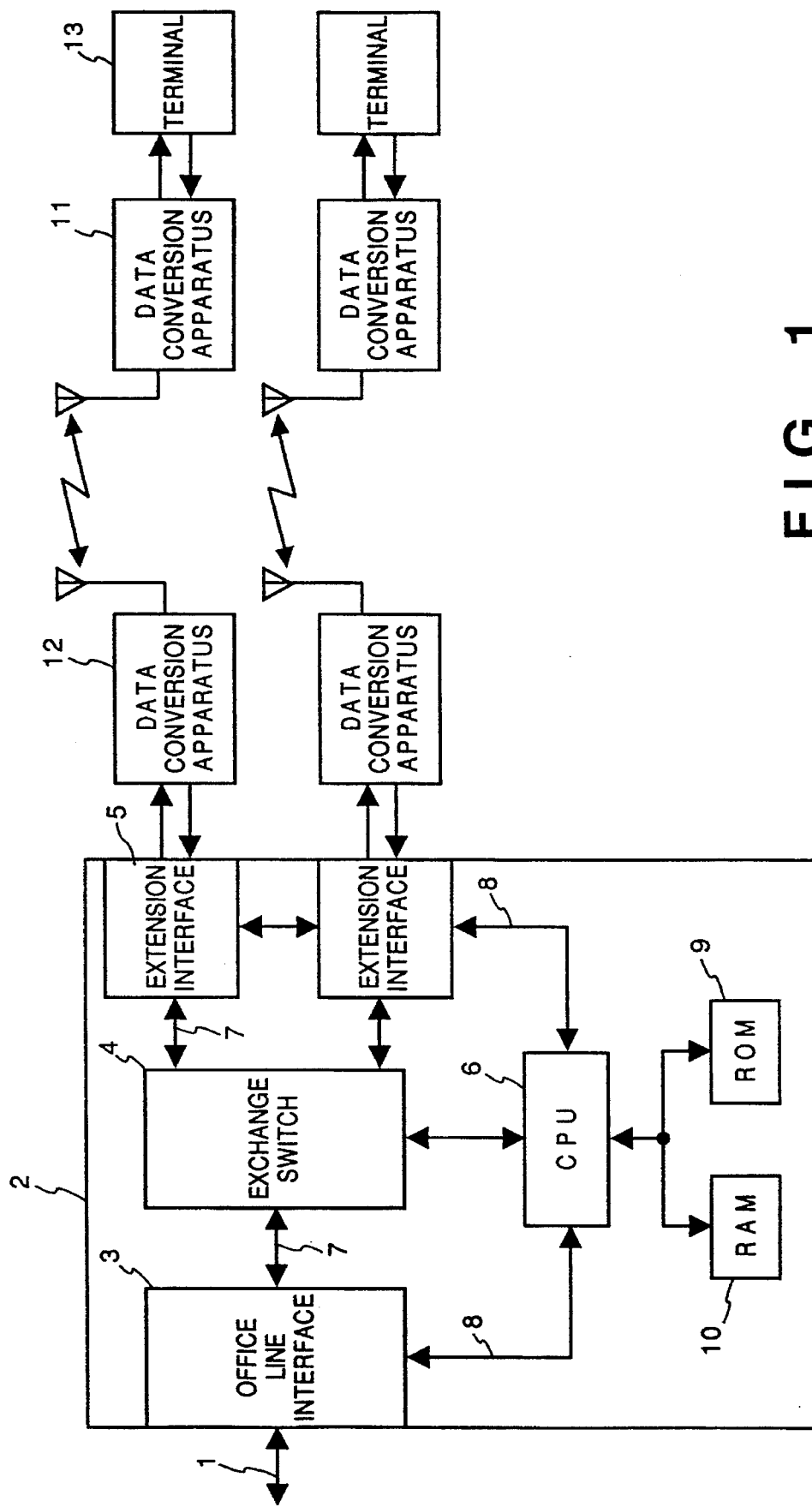
FIG. 1 is a block diagram showing the arrangement of a telephone exchange system according to the first embodiment of the present invention.
Figure 2:
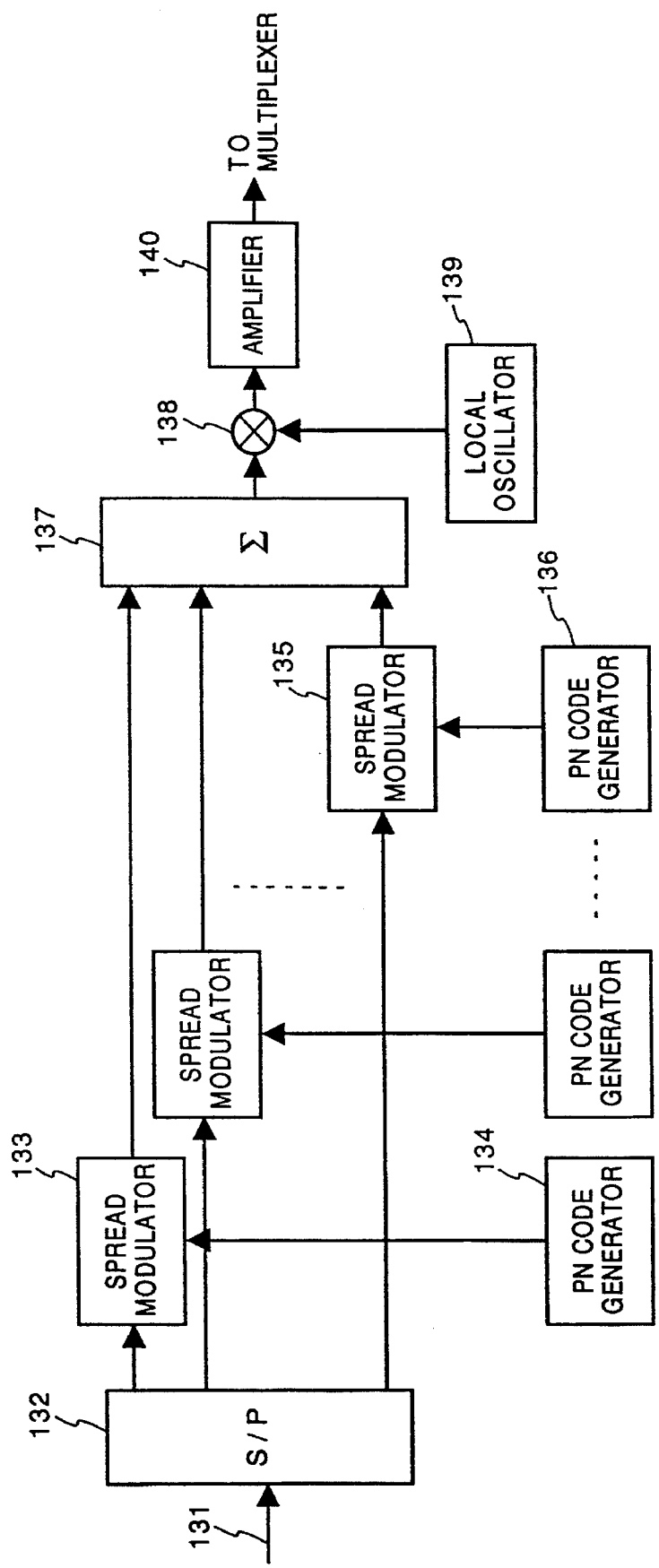
FIG. 2 is a block diagram showing the arrangement of a data conversion apparatus (transmission side) in the telephone exchange system of the first embodiment.
Figure 3:
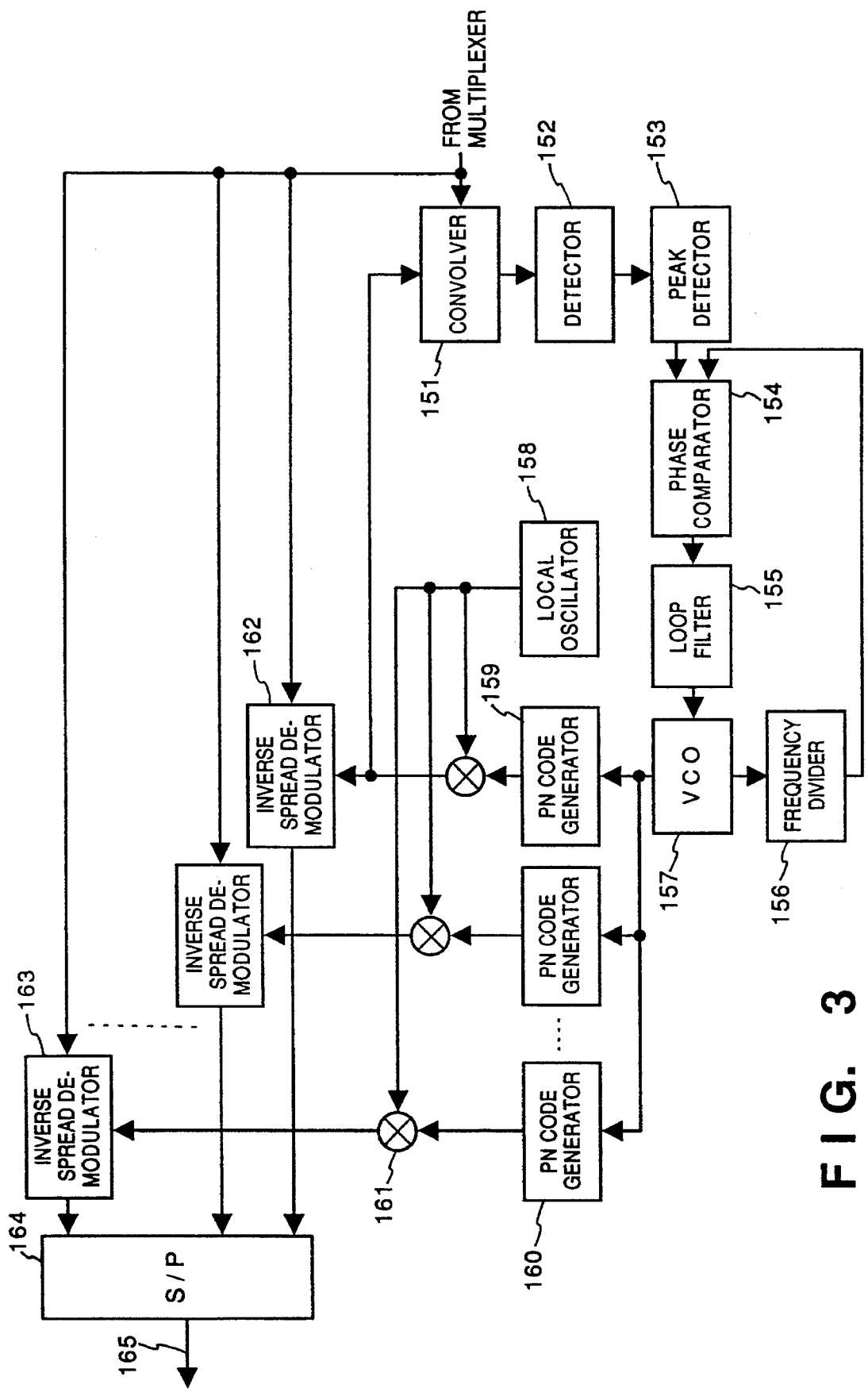
FIG. 3 is a block diagram showing the arrangement of a data conversion apparatus (reception side) in the telephone exchange system of the first embodiment.

FIG. 1 is a block diagram showing the arrangement of a telephone exchange system adopting the present invention, and FIGS. 2 and 3 are block diagrams of a data conversion apparatus.

A case will be described below wherein data is transmitted from a communication terminal 13 in the telephone exchange system shown in FIG. 1.

When the communication terminal 13 performs transmission, control data including a call generation procedure and the like is input to a data conversion apparatus 11. The data signal input to the data conversion apparatus 11 is a baseband data signal. The data conversion apparatus 11 converts the baseband signal into parallel data, and spread-modulates parallel bits using different spread codes, respectively, thus obtaining a high transmission rate.

FIGS. 2 and 3 are block diagrams showing the arrangement of a radio processor in the data conversion apparatus for realizing a spread spectrum communication of parallel data.

FIG. 2 is a block diagram showing the arrangement of a transmission system in the radio processor of the telephone exchange system of this embodiment, and FIG. 3 is a block diagram showing the arrangement of a reception system of the radio processor.

A case will be explained below wherein 64-kbps speech PCM (Pulse Code Modulation) data is input as a baseband signal.

In FIGS. 2 and 3, a baseband signal 131 is input to a serial/parallel converter 132, and is converted into parallel 8-bit data in synchronism with 64-kHz clocks. The converted 8-bit data is spread-modulated using different spread codes in units of bits. The spread codes are generated by eight PN code generators 134 to 136, and are respectively input to eight spread modulators 133 to 135 arranged in correspondence with bits. The eight PN code generators 134 to 136 generate spread codes in synchronism with a common clock. The eight spread signals are added to each other by an adder 137, and the sum signal is mixed with a signal generated by a local oscillator 139 by a mixer 138 so as to be modulated to a radio frequency. The modulated signal is amplified by an amplifier 140, and the amplified signal is transmitted as a radiowave. Control data can also be transmitted in the same manner as speech data.

The transmitted data is received by a data conversion apparatus 12. The received signal is input to a SAW (Surface Acoustic Wave) convolver 151. The convolver 151 also receives a PN code, which is generated by a PN code generator 159, and is modulated by the output signal from a local oscillator 158. The convolver 151 detects a correlation between the two input signals, and outputs a pulse. A detector 152, a peak detector 153, a phase comparator 154, a loop filter 155, a VCO 157, and a frequency divider 156 constitute a phase synchronization circuit. The phase synchronization circuit synchronizes the reception signal and spread codes using the output pulse from the convolver 151. As long as a synchronization is attained, the reception signal can be inversely spread. The spread codes are generated by eight PN code generators 159 to 160, and are mixed with a signal generated by the local oscillator 158. Then, the codes are input to inverse-spread demodulators 162 to 163. The reception signal is also input to the inverse-spread demodulators 162 to 163, and is inversely spread. Note that the spread codes used for inverse spread are different in units of code generators, and correspond to those at the transmission side in units of bits of parallel data. Since each spread code is generated in synchronism with an output signal from one VCO 157, if synchronization is attained for one spread code (in this case, the code generated by the code generator 159), synchronization can be attained for all the eight spread codes.

In this manner, synchronization is maintained, and the reception signal is inversely spread by the eight spread codes. After inverse-spread demodulation, the eight bits are parallel/serial-converted to obtain speech PCM data 165. Note that data exchanged between the data conversion apparatuses 11 and 12 is obtained by multiplexing speech data and control data. The received control data is used in control of the data conversion apparatus.

As described above, data to be transmitted from the data conversion apparatus is converted into parallel data, and the parallel data is spread in units of bits to transmit the spread bits, thus increasing a transmission speed.

In this embodiment, serial data is converted into 8-bit parallel data. However, the present invention is not limited to 8-bit data. If the serial/parallel converter 132 is an n-bit converter, serial data input to the serial/parallel converter 132 is converted into n-channel parallel data. In order to spread n-channel data, n different spread codes (PN codes) are prepared, and data in the respective channels are spread-modulated using different spread codes. After modulation, the spread data are added by the adder 137 in an analog manner, and thereafter, the sum signal is modulated. The modulated signal is then transmitted as a radio signal.

At the reception side, a correlation between reception data and n difference inverse spread codes generated by the PN code generator 159 is detected to acquire and maintain synchronization. As long as synchronization is maintained, reception data can be demodulated by inverse spread using the n different inverse spread codes prepared in advance. The data demodulated by inverse spread are converted into serial data by a parallel/serial converter 164.

With the above arrangement, a spread spectrum communication terminal can be accommodated in an extension of the telephone exchange system.

In the arrangement of this embodiment, since a communication is performed using parallel data, the transmission speed of spread-modulated data can be 1/n that of data to be actually transmitted. Therefore, the processing gain can be increased, and high quality can be obtained.

When parallel data are directly processed in the reception and transmission systems, the serial/parallel converter 132 and the parallel/serial converter 164 can be omitted.

Since n-bit parallel data are transmitted, a communication can be performed at a speed n times that in a serial communication.

When the data conversion apparatus shown in FIGS. 2 and 3 is connected to a personal computer and a printer, a high-quality communication can be performed between the personal computer and the printer.

[Second Embodiment (FIGS. 4 and 5)]

Figure 4:
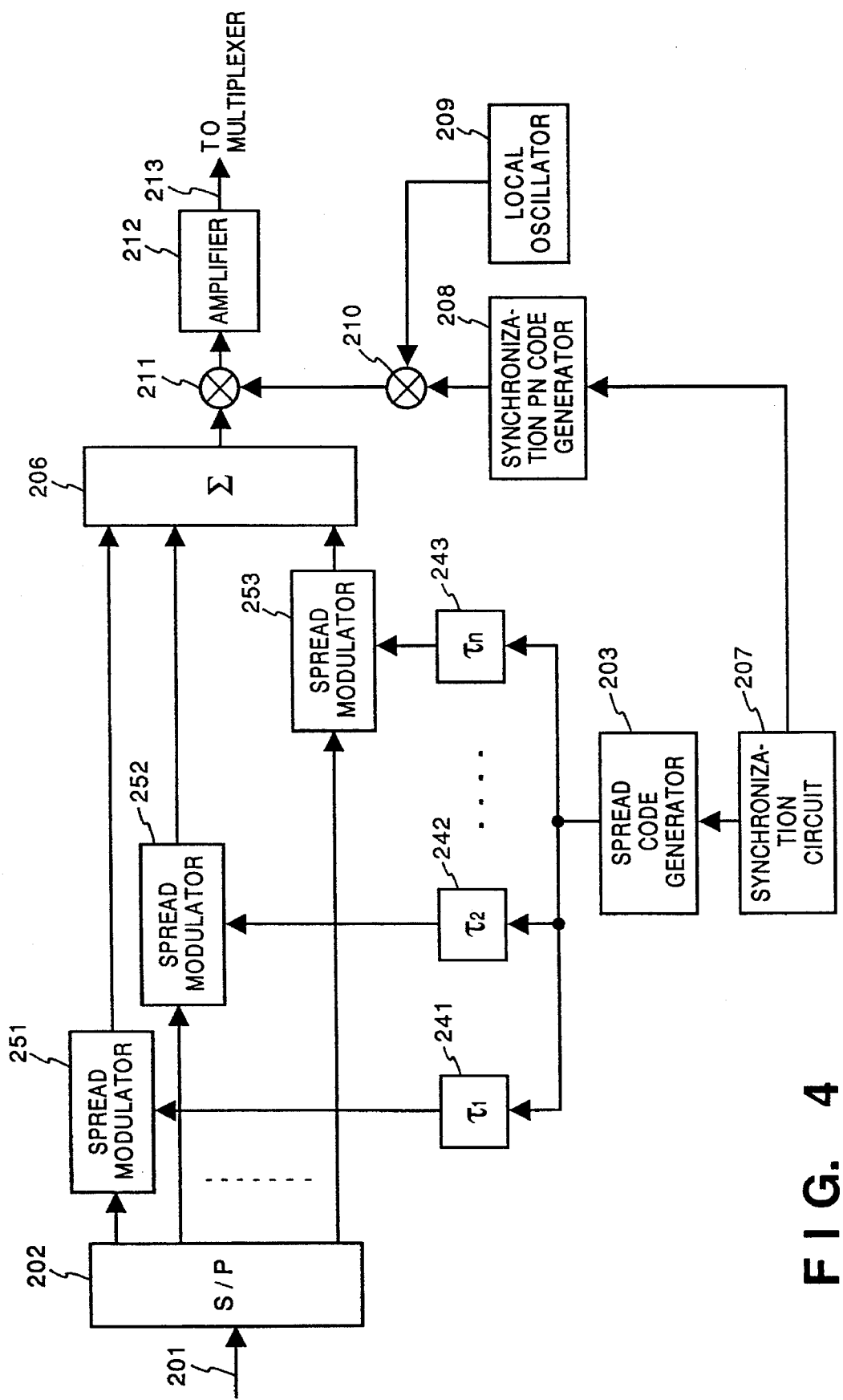
FIG. 4 is a block diagram showing the arrangement of a data conversion apparatus (transmission side) in a telephone exchange system according to the second embodiment of the present invention.
Figure 5:
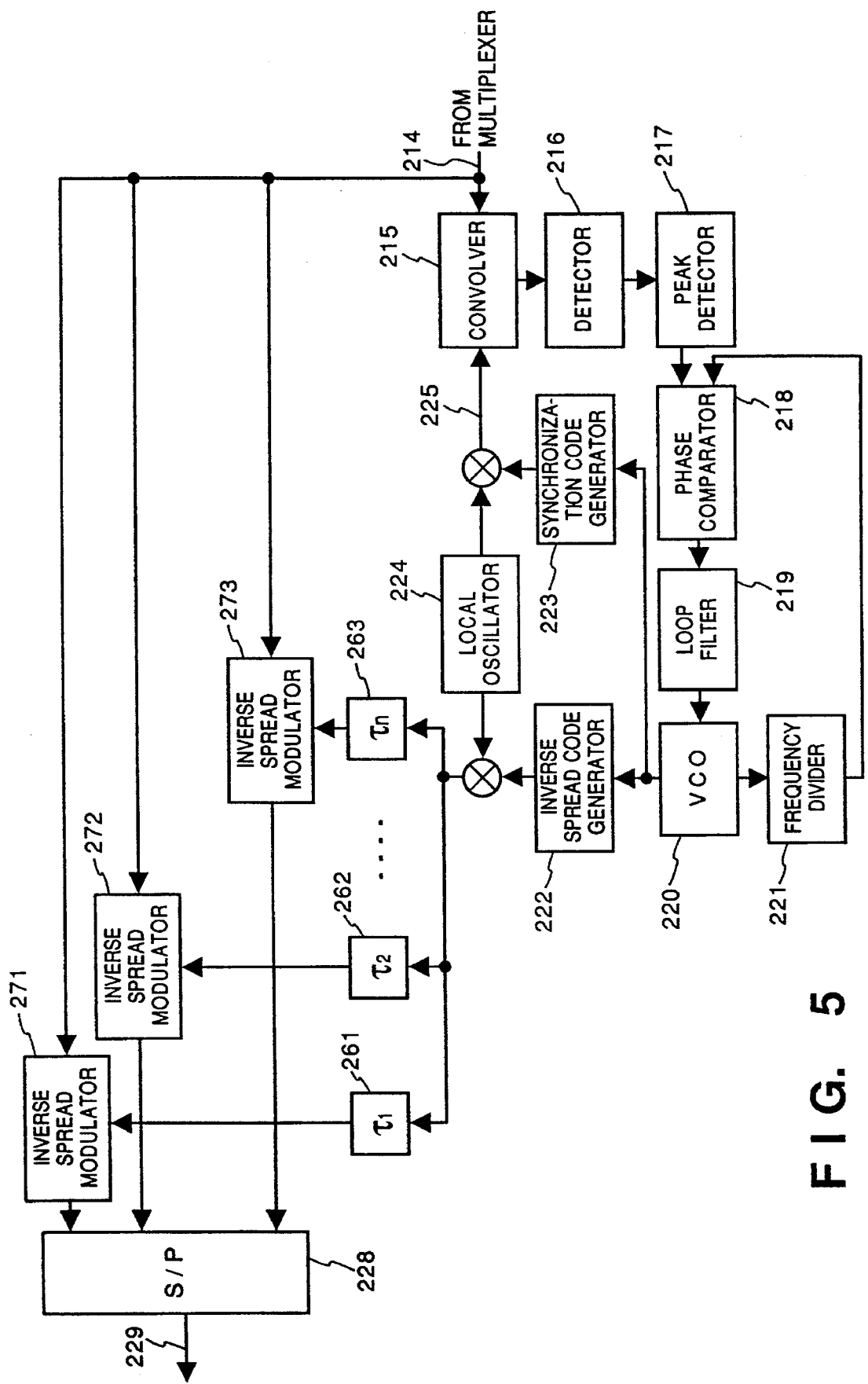
FIG. 5 is a block diagram showing the arrangement of a data conversion apparatus (reception side) in the telephone exchange system of the second embodiment.

FIG. 4 is a block diagram showing the arrangement of a transmission system of a radio processor of a telephone exchange system according to the second embodiment of the present invention, and FIG. 5 is a block diagram showing the arrangement of a reception system of the radio processor. This embodiment exemplifies a telephone exchange system in which the number of spread code generators in the first embodiment is decreased, and its overall arrangement is the same as that shown in FIG. 1.

A data transmission operation will be described below with reference to FIGS. 1, 4, and 5.

In the transmission system shown in FIG. 4, a serial baseband signal 201 is converted into n-channel parallel data by a serial/parallel converter 202 comprising, e.g., shift registers. In this process, a data transmission speed can be decreased to 1/n.

On the other hand, a first spread code generated by a first spread code generator 203 is input to n different delay circuits 241 to 243. A delay time is selected to be shorter than a time corresponding to one period of a spread code pattern, and the delay circuits have different delay times.

Furthermore, a second spread code generator 208 generates a second spread code in synchronism with the first spread code. The second spread code is used to attain synchronization at the reception side, and has the same length as that of the first spread code.

The n-channel parallel data output from the serial/parallel converter 202 are spread-modulated using the n spread codes having different phases by spread modulators 251 to 253. More specifically, each data is modulo-2 added to the corresponding spread code. The spread-modulated data are added to each other by an adder 206 in an analog manner so as to be converted into 1-channel data.

A mixing circuit 210 mixes the output from the second spread code generator 208 and an output from a local oscillator 209, and a multiplier 211 multiplies the output from the adder 206 with the output from the mixing circuit 210. The product data is amplified by an amplifier 212, and the amplified data is transmitted as a radio signal from a multiplexer to an external circuit.

The reception system shown in FIG. 5 also uses two different inverse spread codes like in the transmission system. A first inverse spread code generated by the first inverse spread code generator 222 is input to n different delay circuits 261 to 263, thereby generating n inverse spread codes having different phases. Furthermore, a second inverse spread code generator 223 generates a second inverse spread code in synchronism with the first inverse spread code.

The code patterns of the first and second inverse spread codes and the delay times of the delay circuits 261 to 263 of the reception side coincide with those of the transmission side.

When a radio signal transmitted from the transmission side is received, the reception signal is input to an SAW (Surface Acoustic Wave) convolver 215. The SAW convolver 215 also receives a signal 225 obtained by mixing the output from the second inverse spread code generator 223 with an output from a local oscillator 224. The convolver 215 detects a correlation between the two input signals, and outputs a detection signal. This output signal is detected by a detector 216, and the peak of the detected signal is detected as a peak output by a peak detector 217. Based on the timing of the peak output, synchronization with the transmission side is acquired.

When synchronization is acquired, the synchronization is maintained by a phase synchronization circuit constituted by a phase comparator 218, a loop filter 219, a VCO 220, and the like by utilizing detection of a correlation of the second inverse spread codes. Since both the second and first inverse spread codes are generated with reference to the output from the VCO 220 as a reference timing, the reception signal can be demodulated by inverse spread using the first inverse spread code as long as the synchronization with the transmission side is maintained by the second inverse spread code.

More specifically, the previously generated n inverse spread codes having different phases are multiplied with the reception data to perform inverse-spread demodulation, thus obtaining n-channel data. The n-channel data obtained in this manner are parallel/serial-converted by a parallel/serial converter 228 in the same order as that of the transmission side, thereby obtaining baseband data 229, which is the same as the baseband data 201.

As described above, in the arrangement of this embodiment, since the transmission speed of spread-modulated data can be 1/n that of data to be actually transmitted, the processing gain can be increased, and high quality can be obtained.

As a spread code to be used, an orthogonal system having a small self auto-correlation and cross-correlation may be selected to obtain high quality.

Upon correlation detection, arithmetic processing by, e.g., a DSP (Digital Signal Processor), or the like, or a sliding correlator may be utilized in place of the SAW convolver. In place of the synchronization circuit constituted by the phase comparator, loop filter, VCO, and the like used in this embodiment, synchronization with the transmission side may be attained by utilizing a delay lock loop (DLL).

Since n-bit parallel data are transmitted, a communication can be performed at a speed n times that in a serial communication.

In order to spread n-bit data, since n codes having different phases are derived from one code, n spread codes need not be used.

Since a common code is supplied to n delay circuits having different delay times, an arrangement for generating n codes can be simplified.

When parallel data are directly processed in the reception and transmission systems, the serial/parallel converter 202 and the parallel/serial converter 228 can be omitted.

A synchronization code and one of spread codes may use a common code. More specifically, the reception side attains synchronization based on one of spread codes, and generates another spread code, thus realizing inverse spread synchronized with a reception signal.

The radio processor shown in FIGS. 4 and 5 may be connected to a personal computer and a printer.

[Third Embodiment (FIGS. 6A, 6B, 7, and 8)]

A telephone exchange system, which can realize a connection to an ISDN (Integrated Services Digital Network) terminal connected to an extension, will be described below.

Figure 6A:
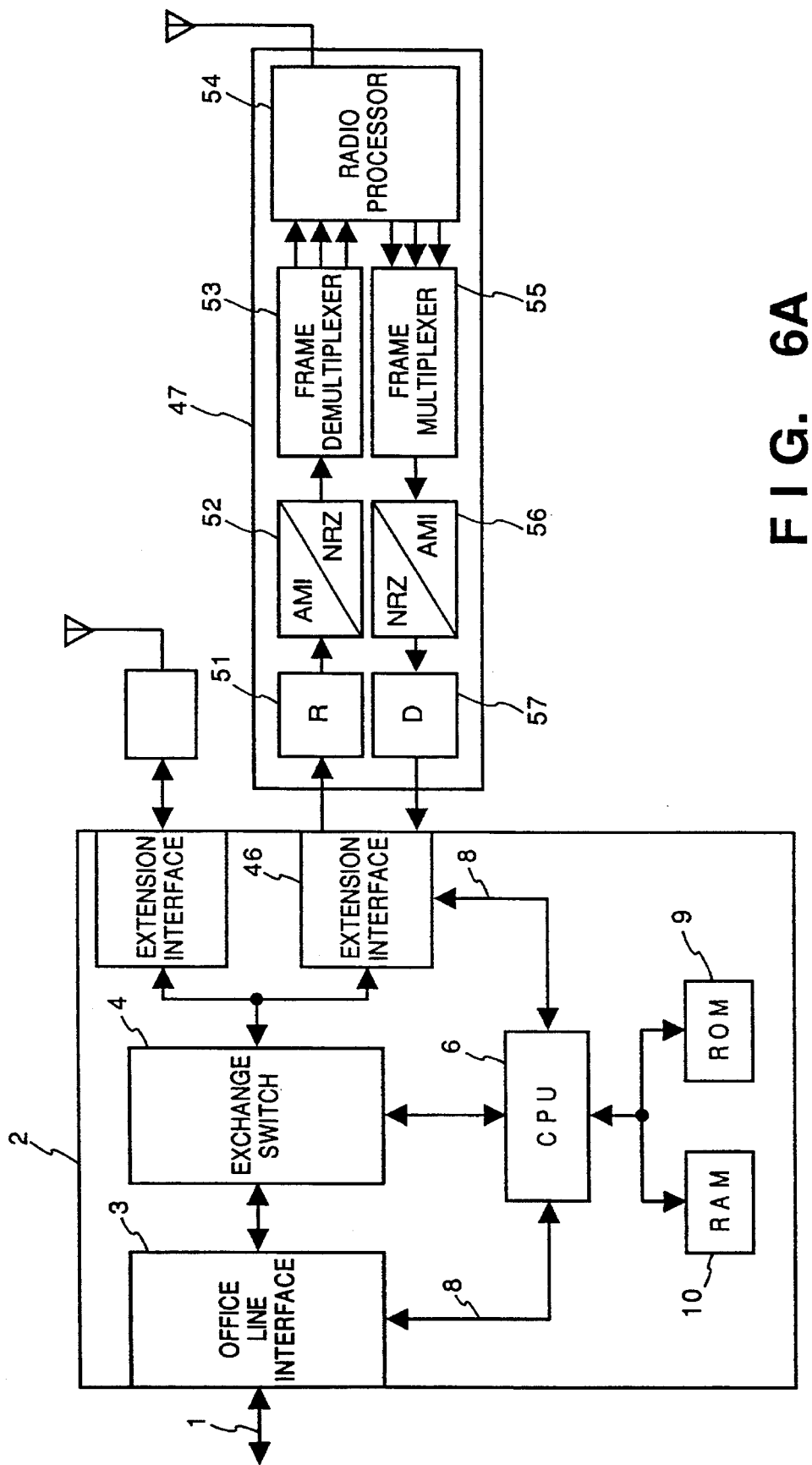
FIG. 6A is a block diagram showing the arrangement of a telephone exchange system according to the third embodiment of the present invention.
Figure 7:
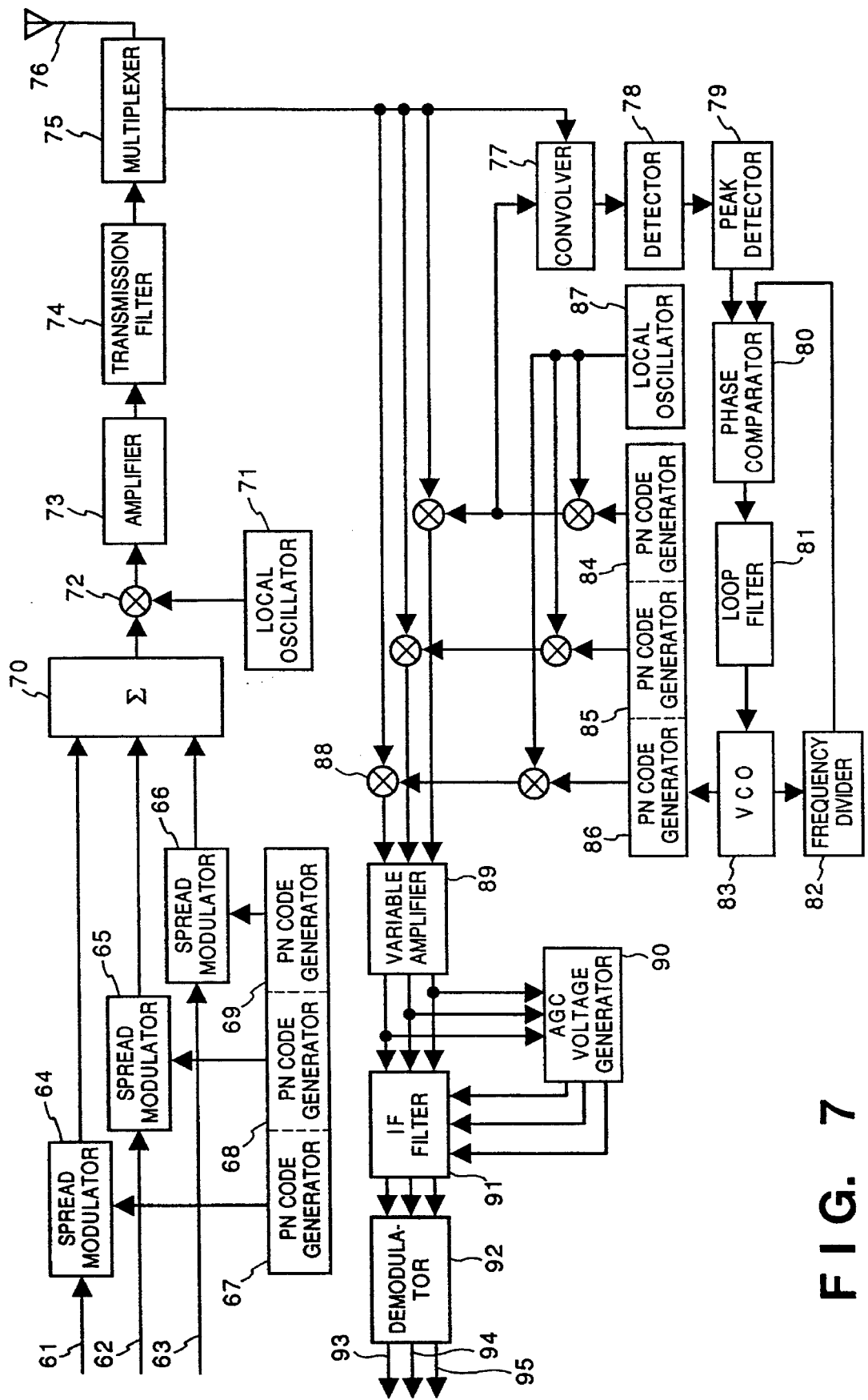
FIG. 7 is a block diagram showing the arrangement of a radio processor in the telephone exchange system of the third embodiment.
Figure 8:
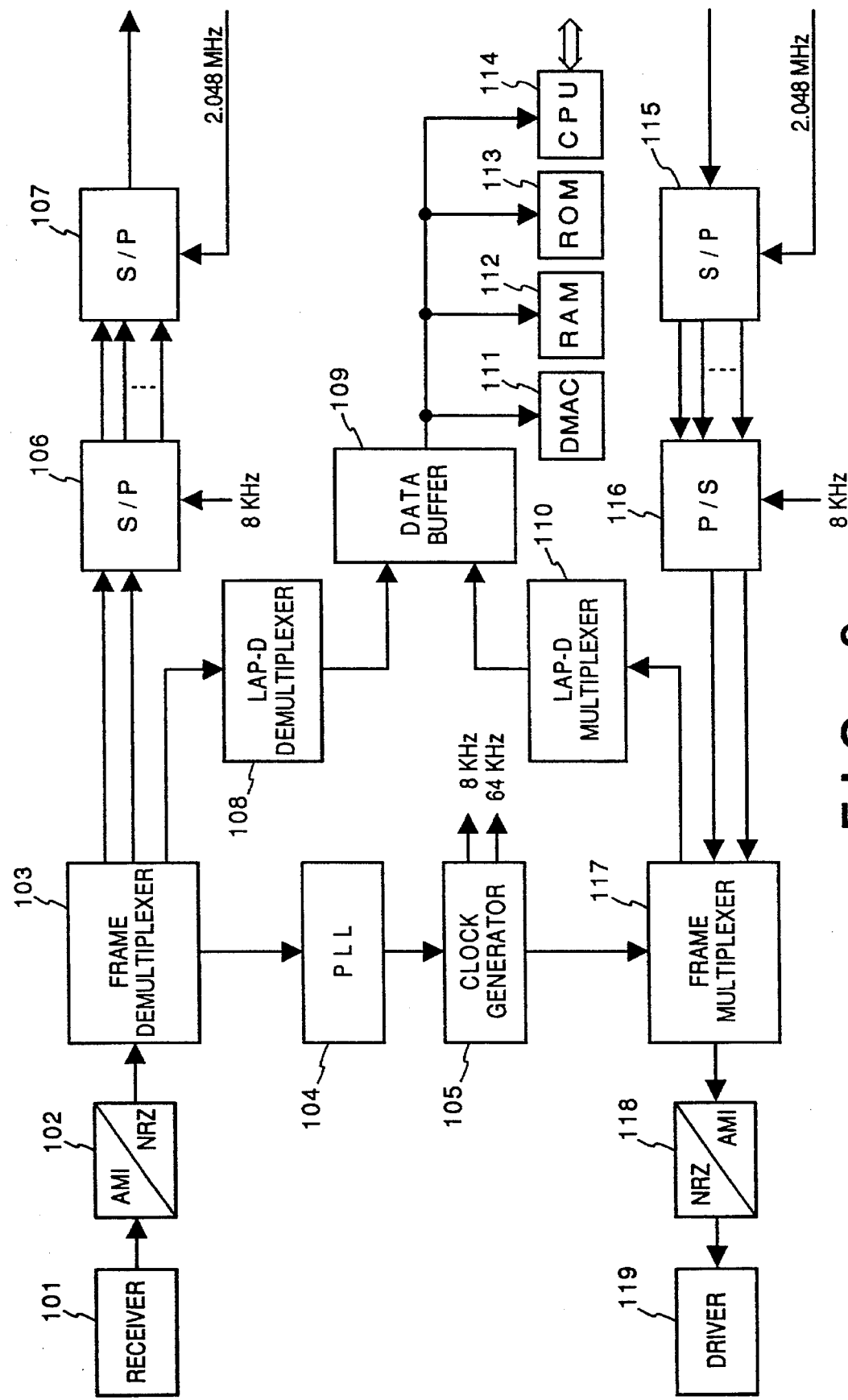
FIG. 8 is a block diagram showing the arrangement of an extension interface of an exchange controller of the third embodiment.

FIGS. 6A and 6B are block diagrams of a telephone exchange system for realizing a communication between an ISDN terminal and another extension terminal, FIG. 7 is a block diagram showing the arrangement of radio processors 49 and 54 of this embodiment, and FIG. 8 is a block diagram showing the arrangement of an extension interface 46 of an exchange controller 2 of this embodiment.

An operation performed when data is transmitted from an ISDN terminal 60 connected to an extension of the telephone exchange system of this embodiment will be described below with reference to FIGS. 6A and 6B, and FIGS. 7 and 8.

When the ISDN terminal 60 performs transmission, AMI (Alternate Mark Inversion)-coded data having a bit rate of 192 kbps (kilobits/sec) is input to a data conversion apparatus 48. As shown in FIG. 6B, in the data conversion apparatus 48, an AMI/NRZ converter 58 converts the received AMI code into an NRZ (Non Return to Zero) code, and thereafter, a frame demultiplexer 50 demultiplexes a multiplexed frame. The frame is constituted by multiplexing two 64-kbps information channels (B1 and B2 channels), a 16-kbps control channel (D channel), and other control bits. The demultiplexed B-channel data are input to the radio processor 49 as baseband signals synchronized with a 64-kHz clock. On the other hand, the demultiplexed D-channel data is input to the radio processor 49 as a baseband signal synchronized with a 16-kHz clock.

The baseband signals of the respective channels input to the radio processor 49 are input to spread modulators 64 to 66, and are multiplied with spread codes generated by PN code generators 67 to 69, respectively. The PN code generators 67 to 69 synchronously generate three different spread codes having the same length. The data of the respective channels are modulated by the three different spread codes. More specifically, the baseband data and the PN codes are respectively modulo-2 added by the modulators 64 to 66 to be converted to spread-modulated signals. The modulated signals are added to each other in an analog manner by an adder 70, and the sum signal is modulated by a modulator 72. The modulated signal is transmitted as a radiowave from an antenna 76 through an IF amplifier 73, a transmission filter 74, and a multiplexer 75. Note that a PN code for the B1 channel is represented by PN1, a PN code for the B2 channel is represented by PN2, and a PN code for the D channel is represented by PN3.

The data transmitted from the data conversion apparatus 48 is received by a data conversion apparatus 47. The received signal is input to a SAW convolver 77 through the antenna 76 and the multiplexer 75. The SAW convolver 77 also receives the code PN1 generated by a PN code generator 84 used in the data conversion apparatus 48, and detects a correlation between PN1 and the reception signal. The correlation is output as a pulse output level from the convolver 77. The peak of the pulse output is detected by a detector 78 and a peak detector 79, and synchronization with the transmission side is attained on the basis of the timing of the detected peak. The synchronization is maintained by a synchronization control circuit constituted by a phase comparator 80, a loop filter 81, and a VCO 83, and utilizing detection of a correlation of PN1. Since the codes PN2 and PN3 are generated based on the same clock as the code PN1, synchronization of the codes PN2 and PN3 can be acquired as long as synchronization of the code PN1 is attained.

Local reference signals are obtained by multiplying an output from a local oscillator 87 with PN codes generated by the PN code generator 84 and PN code generators 85 and 86, which are synchronized previously. More specifically, three different local reference signals are obtained in correspondence with the codes PN1, PN2, and PN3. IF signals obtained by mixing the reception signal with the local reference signals by a demodulator 88 are filtered through an IF filter 91, and the filtered filters are the demodulated by a demodulator 92 in units of channels to obtain baseband signals 93 to 95. These signals are then output from the radio processor 54.

The baseband signals 93, 94, and 95 corresponding to three channels, i.e., the B1, B2, and D channels, are multiplexed by a frame multiplexer 55, and the multiplexed signal is converted into an AMI code by an NRZ/AMI converter 56. The converted code is then transmitted to the extension interface 46.

In the extension interface 46, the received AMI code data is converted into an NRZ code by an AMI/NRZ converter 102, and the converted code is demultiplexed into information channels (B1 and B2 channels) and a control channel (D channel) by a frame demultiplexer 103. The B-channel data are converted into parallel data in synchronism with a 64-kHz clock by a serial/parallel converter 106. The parallel data are converted into serial data by a parallel/serial converter 107 in synchronism with a 2.048-MHz clock supplied from the exchange controller 2. The serial data is multiplexed on a data highway, and is transmitted to an exchange switch 4.

On the other hand, the D-channel data is demultiplexed by an LAP-D demultiplexer 108, and demultiplexed data are temporarily stored in a data buffer 109. The stored data are DMA-transferred to a RAM 112 by a DMAC (Direct Memory Access Controller) 111. A CPU 114 in the extension interface executes a program stored in a ROM 113 to decode the D-channel data stored in the RAM 112, and transmits necessary information to the exchange controller 2. In this case, the information is DMA-transferred through an inter-CPU communication bus by a DMAC in the exchange controller 2.

The data input to the exchange controller 2 are transmitted to an office line interface 3 or the extension interface 46 designated by the D channel data through the exchange switch 4 under the control of the CPU 6. When the data is to be transmitted to another extension interface, the B- and D-channel data are transmitted in a flow opposite to the above-mentioned data transmission from the ISDN terminal, and are multiplexed into a frame converted into an AMI code by an NRZ/AMI converter 118 of the extension interface. The frame is then transmitted to the data conversion apparatus 47.

Processing after the data is input to the data conversion apparatus 47 is the same as processing when data is input from the ISDN terminal 58 to the data conversion apparatus 48. In this case, as the spread codes PN1, PN2, and PN3, different codes having the same string length as the spread codes used in the data conversion apparatus 48 are used. As a result, the transmission-side PN code generators of the data conversion apparatus 47 and the reception-side PN code generators of the data conversion apparatus 48 generate the same codes, and the reception-side PN code generators of the data conversion apparatus 47 and the transmission-side PN code generators of the data conversion apparatus 48 generate the same codes.

When data transmission between the extension interface 46 and the data conversion apparatus 47 is performed using an AMI code of the ISDN like in this embodiment, the data conversion apparatuses 47 and 48 can have the same arrangement.

As a spread code, an orthogonal system having a small auto-correlation and cross-correlation may be used to obtain high quality.

As described above, the exchange system connected to the ISDN terminal can use the spread spectrum communication. Thus, a radio exchange system having a high privacy function can be constituted.

In addition, a radio exchange system which can assure a long extension transmission distance while utilizing a very weak radiowave can be constituted.

Even in a telephone exchange system in which a large number of uses perform communications at the same time, high-speed data transmission can be realized without mutual interferences as compared to a conventional system.

[Fourth Embodiment (FIGS. 9A, 9B, and 10)]

Figure 9A:
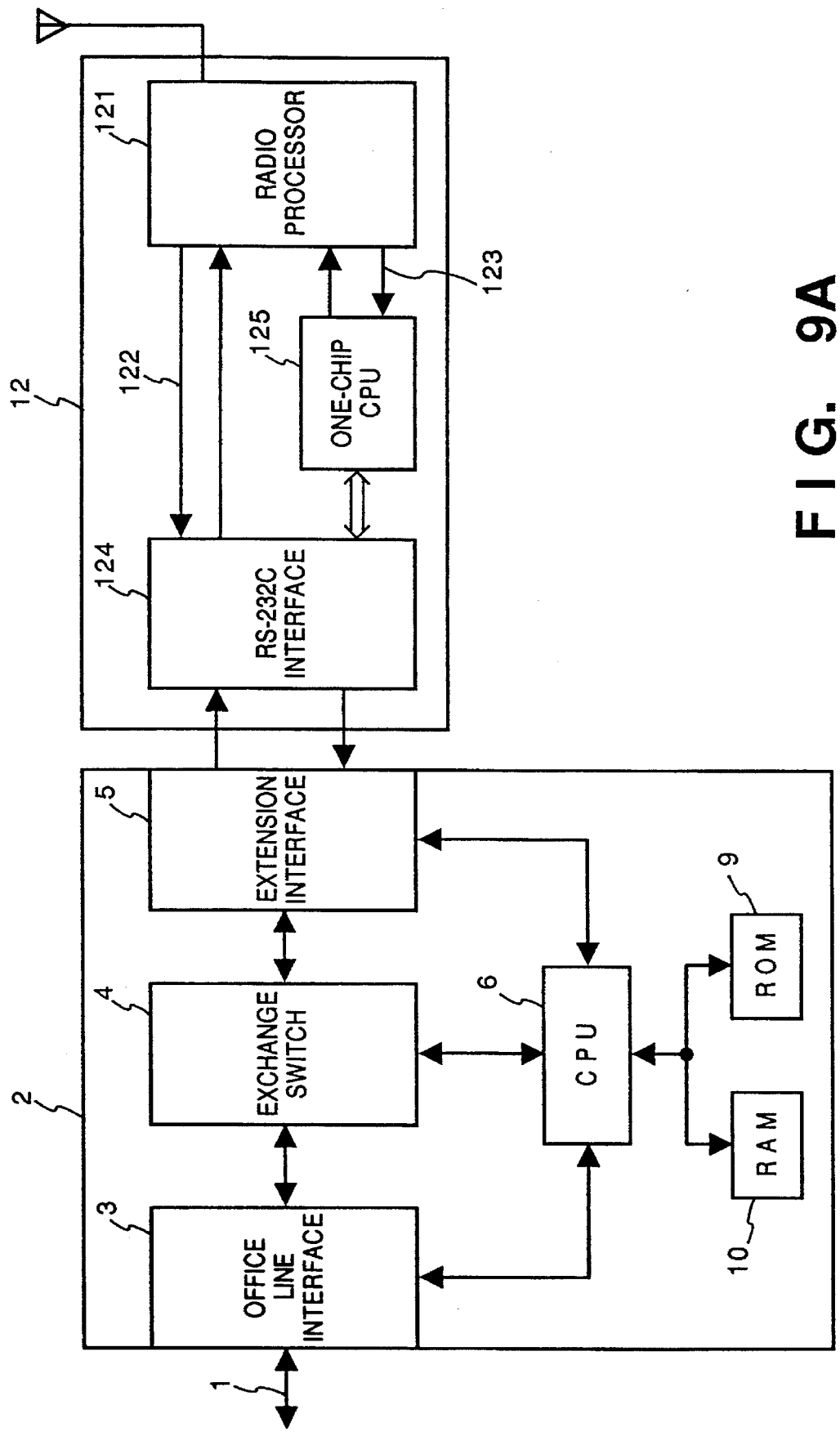
FIG. 9A is a block diagram showing the arrangement of a telephone exchange system according to the fourth embodiment of the present invention.
Figure 9B:
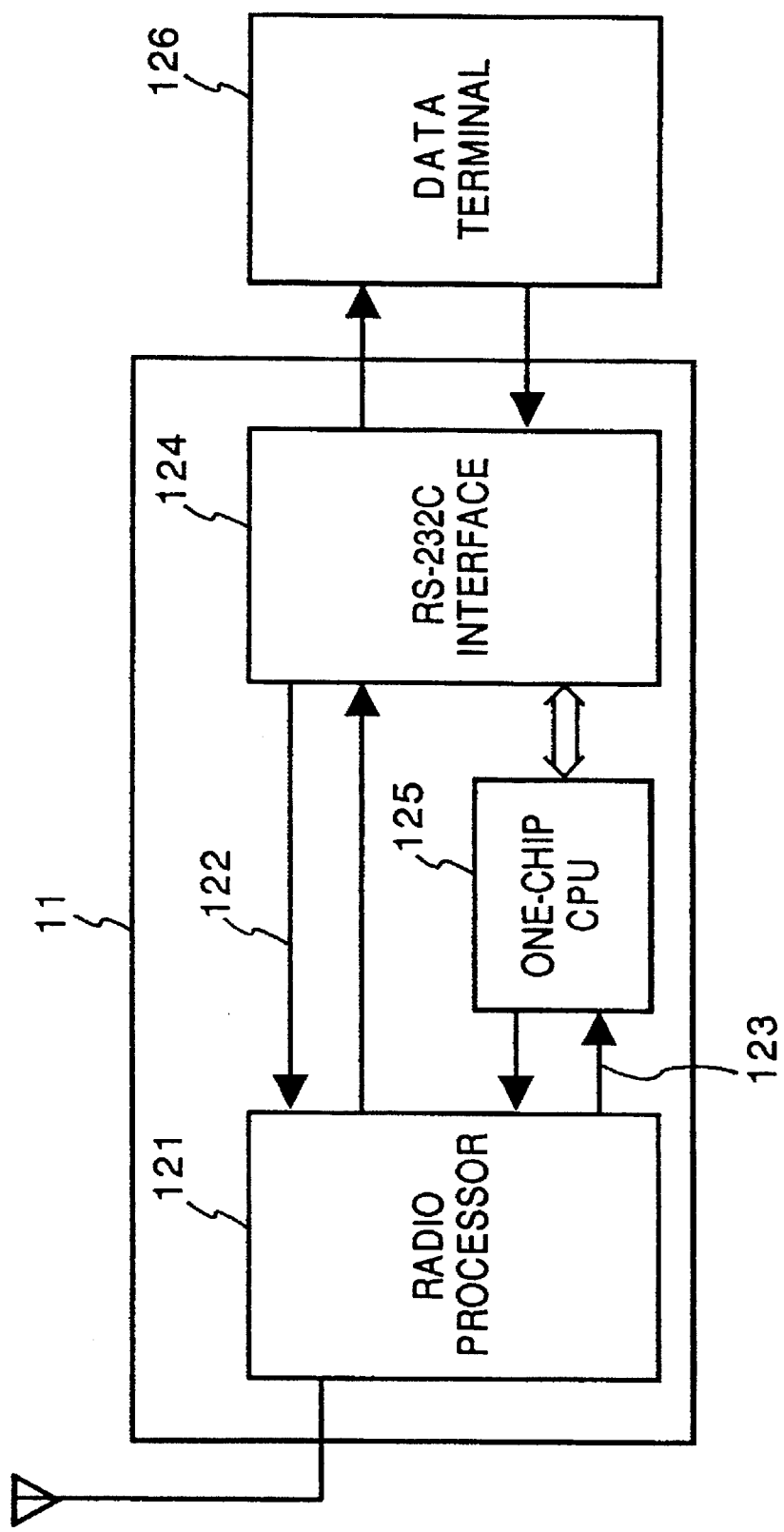
FIG. 9B is a block diagram showing the arrangement of an extension terminal connected to the telephone exchange system of the fourth embodiment.

FIGS. 9A and 9B are block diagrams of a telephone exchange system and an extension terminal according to the fourth embodiment of the present invention. A radio processor 121 in a data conversion apparatus 11 or 12 in this arrangement has the arrangement shown in FIG. 10.

When the data conversion apparatus 12 with this arrangement is used, a data terminal 126 such as a personal computer can be connected through an RS-232C interface 124. Various modem control signals in the RS-232C interface 124 are input to a one-chip CPU 125, and are then input as a baseband signal 123 from a serial communication interface incorporated in the one-chip CPU 125 to the radio processor 121. On the other hand, 9,600-bps data are input to the radio processor 121 without going through the CPU. More specifically, the radio processor 121 has two input data channels.

Figure 10:
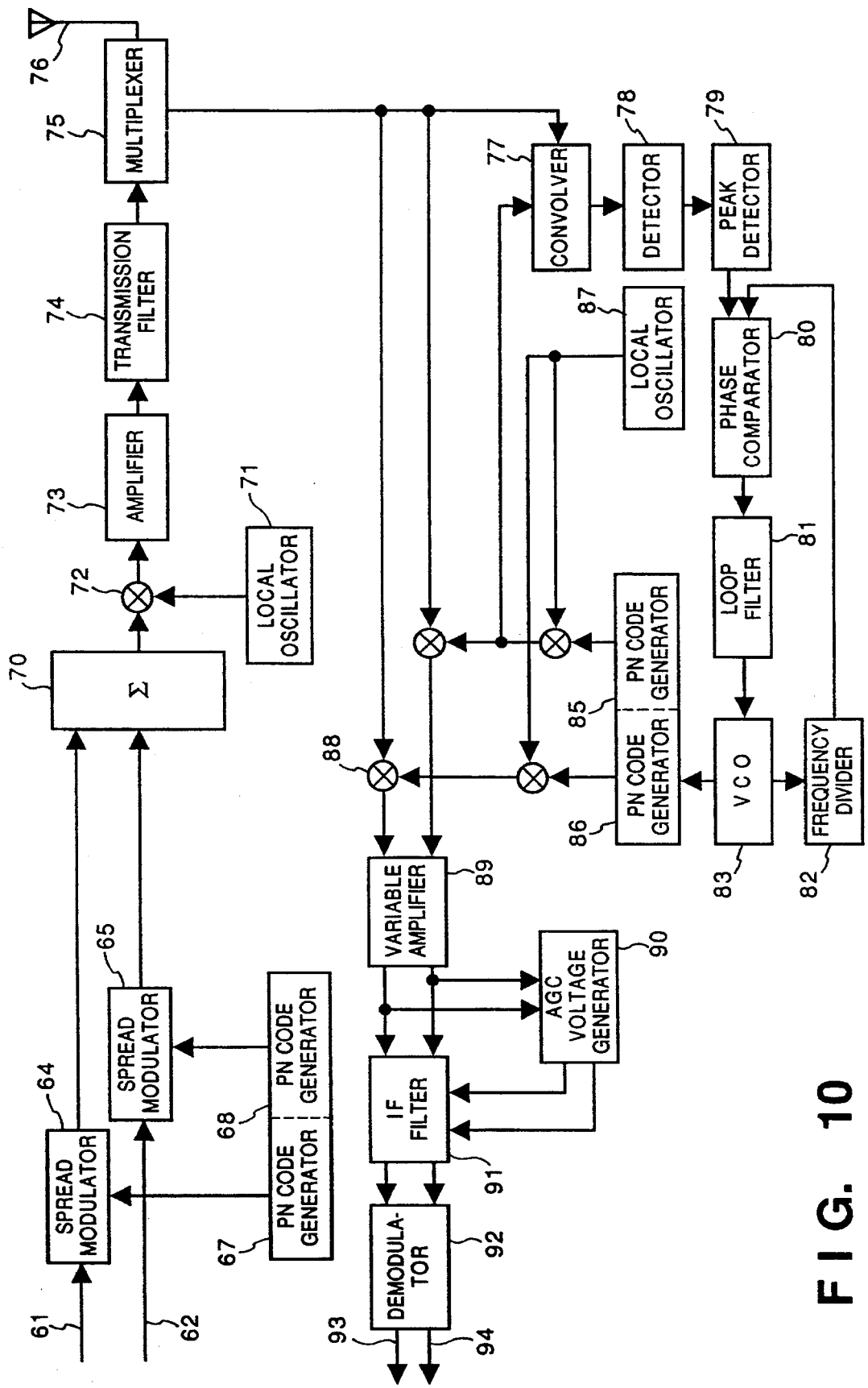
FIG. 10 is a block diagram showing the arrangement of a data conversion apparatus in the telephone exchange system of the fourth embodiment.

FIG. 10 is a block diagram showing the arrangement of the radio processor 121. A signal flow will be described below with reference to FIGS. 9A and 9B and FIG. 10.

When the data terminal 126 transmits data, the transmitted data is input to the data conversion apparatus 11. As shown in FIG. 10, in the data conversion apparatus 11, various modem control signals in the RS-232C interface 124 are input to the one-chip CPU 125, and are then input as the baseband signal 123 from the serial communication interface incorporated in the one-chip CPU 125 to the radio processor 121. On the other hand, 9,600-bps data are input to the radio processor 121 without going through the CPU.

Two baseband signals 61 and 62 input to the radio processor 121 are respectively input to spread modulators 64 and 65, and are modulated to be multiplied with spread codes synchronously generated by PN code generators 67 and 68. More specifically, the modulators 64 and 65 modulo-2 add the baseband signals and the PN codes to generate spread-modulated signals. The PN code generators 67 and 68 generate two different spread codes having the same length. Of these codes, the PN code for the baseband signal 61 is represented by PN1, and the PN code for the baseband signal 62 is represented by PN2.

The spread-modulated signals as the outputs from the modulators 64 and 65 are added to each other by an adder 70 in an analog manner, and the sum signal is then modulated by a modulator 72 by a signal generated by a local oscillator 71. The modulated signal is transmitted as a radiowave from an antenna 76 through an amplifier 73, a transmission filter 74, and a multiplexer 75.

The transmitted data is received by the data conversion apparatus 12. The received signal is input to an SAW convolver 77 through the antenna 76 and the multiplexer 75. The SAW convolver 77 also receives the code PN1 generated by a PN code generator 85 used in the data conversion apparatus 12. The SAW convolver 77 detects a correlation between the two input signals, and outputs a pulse. When one input signal is delayed, the convolver 77 delays the output pulse according to the delay amount. The reception side acquires synchronization with the transmission side on the basis of the peak timing of this pulse output. The synchronization is maintained by a phase synchronization circuit constituted by a phase comparator 80, a loop filter 81, a frequency divider 82, and a VCO 83, and utilizing detection of a correlation between PN1 and the reception signal. As long as synchronization of the code PN1 is attained, since the code PN2 uses the same output from the VCO 83 as the code PN1 as a clock, synchronization can be acquired.

Local reference signals are obtained by multiplying an output from a local oscillator 87 with PN codes generated the PN code generator 85 and a PN code generator 86. More specifically, since there are two different PN codes PN1 and PN2, two different local reference signals are obtained. The reception signal and the two local reference signals are mixed by a demodulator 88 to obtain IF signals. The IF signals are demodulated by a demodulator 92 in units of channels through an IF filter 91, thus obtaining baseband data 93 and 94.

The baseband data are transmitted to an extension interface 5 of an exchange controller 2 through the one-chip CPU 125 and the RS-232C interface 124.

In the exchange controller 2, a central controller 6 controls an exchange switch 4 according to input control data to transmit data to a destination line. FIG. 10 illustrates only one extension terminal. However, a plurality of terminals may be arranged.

With this arrangement, an RS-232C interface terminal can be connected to the telephone exchange system by a spread spectrum communication.

The radio processor shown in FIG. 10 may be connected to a personal computer and a printer.

[Fifth Embodiment (FIG. 11)]

FIG. 11 is a block diagram of a data conversion apparatus of a telephone exchange system according to the fifth embodiment of the present invention. The arrangement of the overall exchange system is the same as that shown in FIG. 1. This embodiment exemplifies a telephone exchange system for performing communications between a terminal and the exchange system by spreading or inversely spreading transmission/reception data serially.

A case will be explained below wherein data is transmitted from a communication terminal 13 in the telephone exchange system shown in FIGS. 1 and 11.

When the communication terminal 13 performs transmission, control data including a call generation procedure and the like is input to a data conversion apparatus 11. The data signal input to the data conversion apparatus 11 is a baseband data signal 21.

The data signal 21 is input to a spread modulator 22 shown in FIG. 11, and is multiplied with a spread code generated by a PN (Pseudo Noise) code generator 23. More specifically, the baseband data signal 21 and a PN code are added to each other by a modulo-2 adder to obtain a spread-modulated signal. The spread-modulated data is modulated by a mixer 24 using a signal generated by a local oscillator 25, and the mixed signal is transmitted as a radiowave signal from an antenna 29 through an IF (Intermediate Frequency) amplifier 26, a transmission filter 27, and a multiplexer 28.

The transmitted radiowave signal is received by a data conversion apparatus 12. The received signal is input to a SAW (Surface Acoustic Wave) convolver 30 through the antenna 29 and the multiplexer 28. On the other hand, the SAW convolver 30 also receives a PN code generated by a PN code generator 37, which code is modulated by a local oscillator 38 and a mixer 39. The PN code generator 37 generates the same PN code as that generated by the PN code generator 23 in the data conversion apparatus 11.

The convolver 30 detects a correlation between the two input signals, and outputs a pulse. When one input signal is delayed, the convolver 30 delays the output pulse according to the delay amount. The reception side detects the output pulse by a detector 31 and a peak detector 32, and acquires synchronization with the transmission side on the basis of the detected peak. The synchronization is maintained by a phase lock loop constituted by a phase comparator 33, a loop filter 34, a frequency divider 35, and a VCO (Variable Controlled Oscillator) 36, and utilizing detection of a correlation between a PN code and the reception signal. While the synchronization is maintained, the PN code generated by the PN code generator 37 is input to an inverse spread demodulator 40 to inversely spread the reception signal.

A local reference signal is obtained by multiplying a PN code generated by the PN code generator 37 and an output from the local oscillator 38. The reception signal and the local reference signal are inversely spread by the inverse spread demodulator 40 to obtain an IF signal. The IF signal is amplified by a variable amplifier 41, and is filtered through an IF filter 43. The filtered signal is demodulated by a demodulator 44 to obtain a baseband data signal 45.

Control data is sent as a baseband signal to an exchange controller 2 through an extension transmission path. A CPU 6, which received the control data, controls an exchange switch 4 to connect a transmission extension to an extension or an office line designated by the control data. A message indicating the end of connection is sent from the exchange controller 2 to the communication terminal 13 in a flow direction opposite to that of transmission. A calling signal and a response signal when a called party is a communication terminal 13 are processed in the same procedure as in the above description.

Upon reception of the message indicating the end of connection, the communication terminal 13 starts transmission of speech data. The speech data is time-divisionally multiplexed with control data, and the exchange controller 2 can receive the speech data and the control data independently of each other.

When a speech communication is to be performed with another extension, speech data from the terminal 13 is spread-modulated by a connection-destination data conversion apparatus through an extension interface 5, the exchange switch 4, and the extension interface of the connection-destination data conversion apparatus, and is then transmitted to a communication terminal.

Note that the data conversion apparatus may be included in the communication terminal 13 or the exchange controller 2.

In this embodiment, information transmitted from the terminal 13 through the data conversion apparatus 11 is inversely spread by the data conversion apparatus 12. The CPU 6 analyzes obtained control information, and controls the exchange switch 4 to connect a line to the call termination side. The inversely spread speech information is spread by the data conversion apparatus through the exchange switch 4 and the extension interface, and is transmitted to a terminal.

With this arrangement, a spread spectrum communication terminal can be accommodated in an extension of the telephone exchange system.

Control data may be PSK-modulated, and speech data may be spread-modulated.

A radio exchange system having a high privacy function can be constituted.

A radio exchange system, which assures a long extension transmission distance while utilizing a very weak radio-wave, can be constituted.

Even in a telephone exchange system wherein a large number of users simultaneously make communications, high-speed data transmission can be realized as compared to a conventional system without causing mutual interferences.

[Sixth Embodiment]

As described in the above embodiments, when a communication between a terminal and an exchange system is performed by a spread spectrum communication, spread codes are assigned in units of terminals in advance.

However, since the number of spread codes suitable for a multiple access is small, when a telephone exchange system is constituted by using spread spectrum communications, the number of terminals, which can be connected to an exchange controller, becomes undesirably small.

Figure 12:
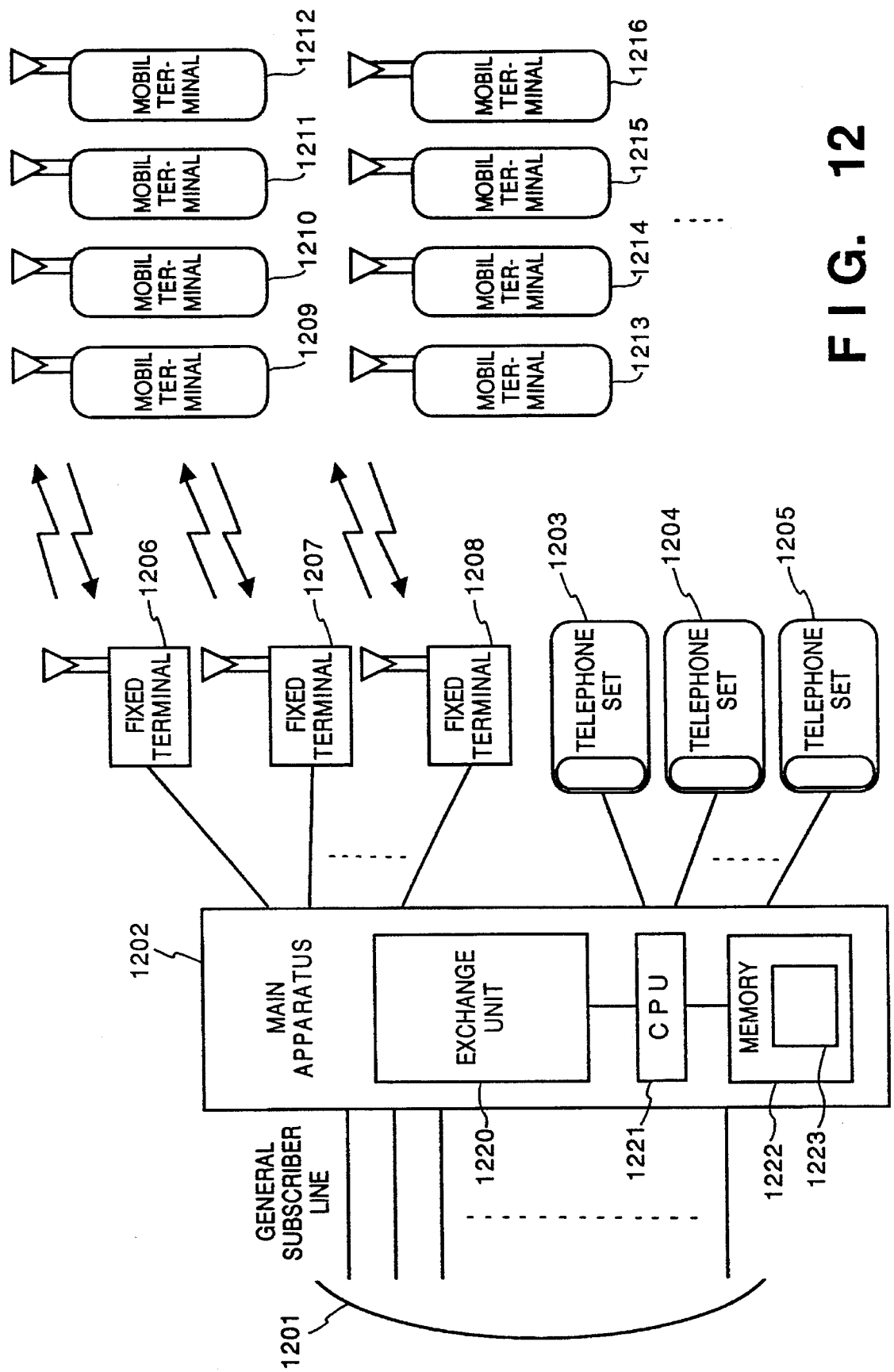
FIG. 12 is a block diagram showing the arrangement of a telephone exchange system according to the sixth embodiment of the present invention.

FIG. 12 is a block diagram of a telephone exchange system wherein an exchange controller and terminals are connected by radio by spread spectrum communications. A main apparatus 1202 for performing exchange control is connected to subscriber lines 1201. The main apparatus 1202 comprises an exchange unit 1220. The exchange unit 1220 comprises a memory 1222 for storing programs, data, and the like, and is controlled by a CPU (central processing unit) 1221. The memory 1222 is allocated with a spread code use condition table 1223 (to be described later). The main apparatus 1202 is connected to fixed terminals 1206 to 1208, and telephone sets 1203 to 1205. The fixed terminals are connected to mobile terminals 1209 to 1216 by radio. The mobile terminals 1209 to 1216 incorporate transmitter/receiver units having the same arrangement as those in the fixed terminals 1206 to 1208. In this embodiment, the fixed terminal 1206 is connected to the mobile terminals 1209 and 1210, the fixed terminal 1207 is connected to the mobile terminals 1211 and 1212, and the fixed terminal 1208 is connected to the mobile terminals 1213 and 1216.

Figure 13:
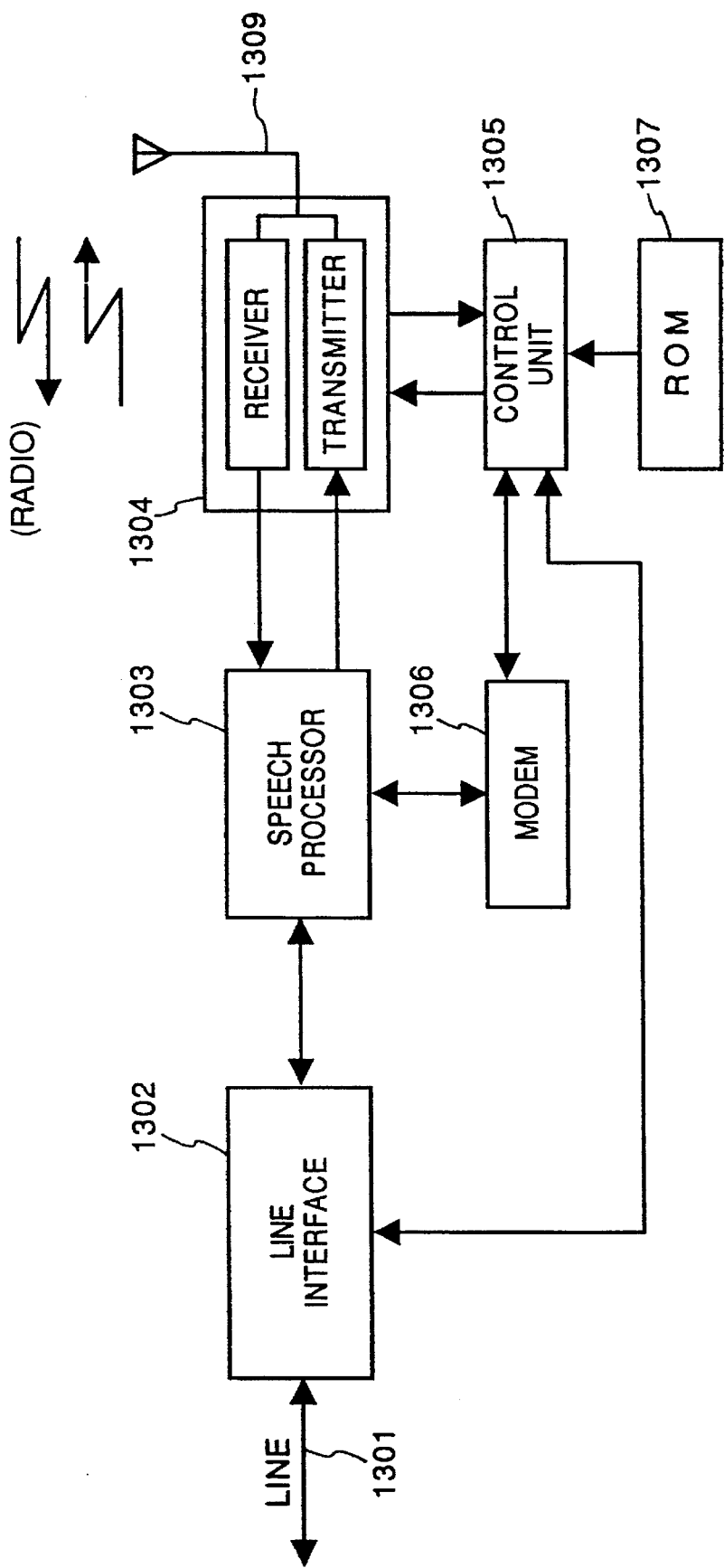
FIG. 13 is a block diagram showing the arrangement of a fixed terminal of the telephone exchange system of the sixth embodiment.

FIG. 13 is a block diagram of the fixed terminals 1206 to 1208. A line interface 1302 accommodates an extension 1301 from the main apparatus 1202. The line interface 1302 is connected to a transmitter/receiver unit 1304 through a speech processor 1303. The line interface 1302, the speech processor 1303, and the transmitter/receiver unit 1304 are controlled by a control unit 1305. Control data for the mobile terminals are exchanged between the speech processor 1303 and the controller 1305 through a modem 1306.

Spread codes used in the system are stored in a ROM (read-only memory) 1307. The control unit 1305 reads out a spread code determined by the main apparatus 1202 from the ROM 1307, and controls the transmitter/receiver unit 1304. The transmitter/receiver unit 1304 has an antenna 1309 commonly used in transmission and reception.

Figure 14:
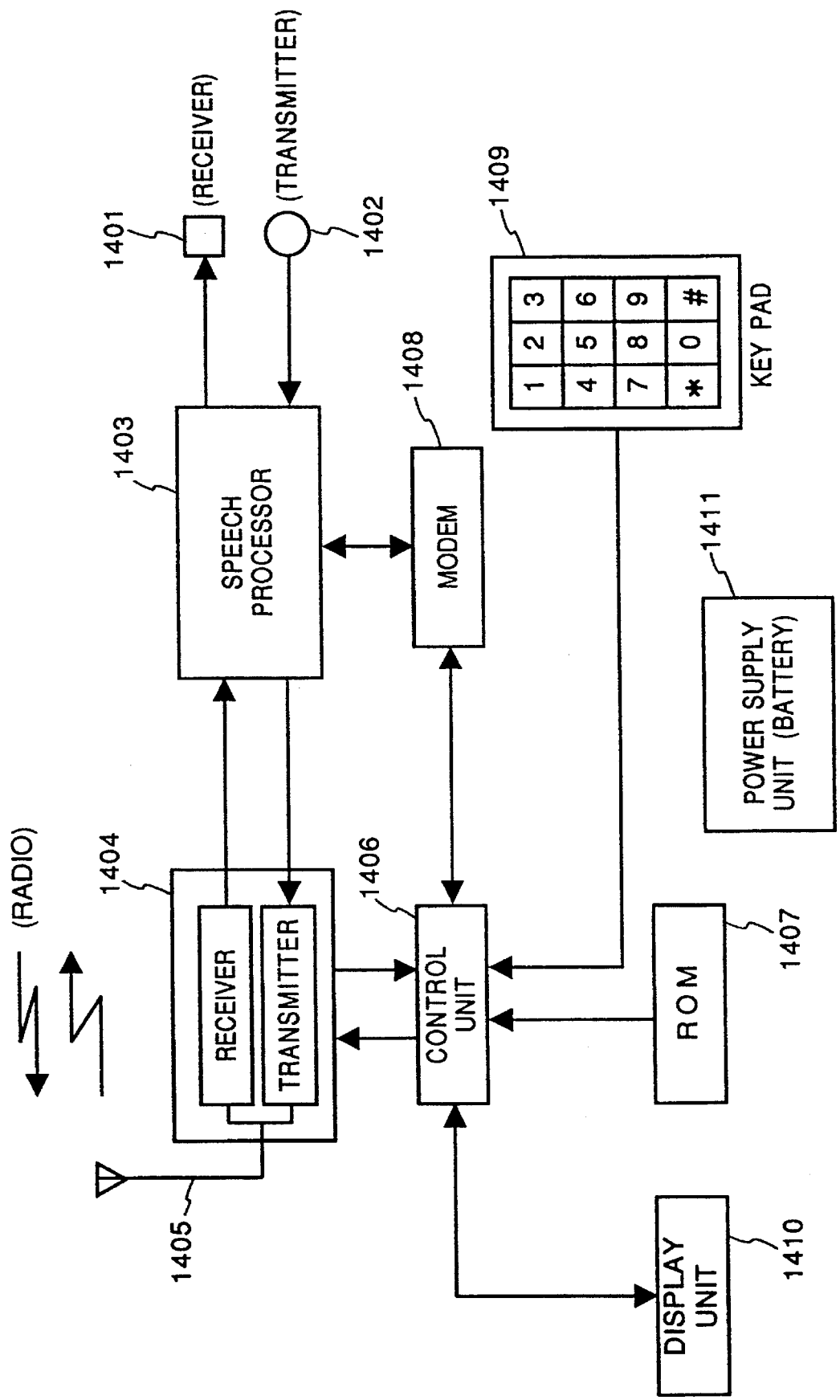
FIG. 14 is a block diagram showing the arrangement of a mobile terminal of the telephone exchange system of the sixth embodiment.

FIG. 14 is a block diagram of the mobile terminals 1209 to 1216. A transmitter 1402 and a receiver 1401 are connected to a transmitter/receiver unit 1404 through a speech processor 1403, and are connected by radio to the fixed terminal through an antenna 1405.

A ROM 1407 of the mobile terminal stores the same spread codes as those stored in the ROM 1307 of the fixed terminal. A control unit 1406 reads out the spread code designated by the fixed terminal from the ROM 1407, and controls the transmitter/receiver unit 1404. The control unit 1406 is connected to the speech processor 1403 through a modem 1408, receives an input signal from a key pad 1409, and displays data on a display unit 1410. A power supply unit 311 is a power supply for portable use.

Note that the ROMs 1307 and 1407 store a plurality of spread codes (including control spread codes).

Figure 15:
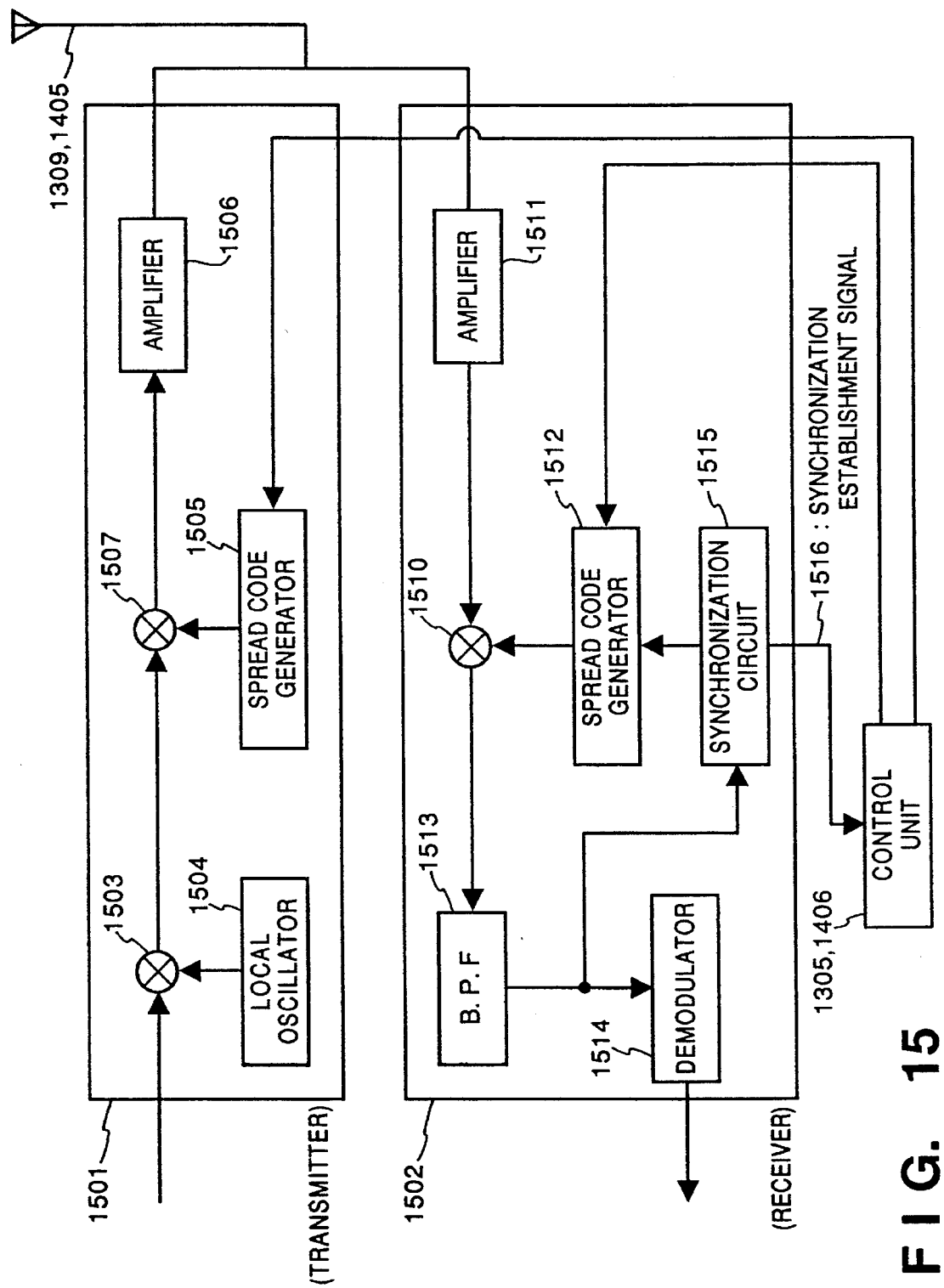
FIG. 15 is a block diagram showing the arrangement of a transmitter/receiver unit of the telephone exchange system of the sixth embodiment.

FIG. 15 is a block diagram of the transmitter/receiver units 1304 and 1404 shown in FIGS. 13 and 14. The transmitter/receiver unit comprises a transmitter unit 1501 and a receiver unit 1502. A transmission signal output from the speech processor 1303 (or 1403) is input to a multiplier 1503, and is multiplied with a carrier wave output from a local oscillator 1504. The product is input to a multiplier 1507. The modulation signal is multiplied with a spread code output from a spread code generator 1505 by the multiplier 1507 for the purpose of spread spectrum modulation. The spread-modulated signal is transmitted from the antenna 1309 (or 1405) through an amplifier 1506.

Note that the spread code generator 1505 is controlled by the control unit 1305 or 1406 shown in FIG. 13 or 14.

A signal received at the antenna 1309 (or 1405) is input to the multiplier 1510 through an amplifier 1511. The multiplier 1510 multiplies the reception signal with a spread code output from a spread code generator 1512 to inversely spread the spread-spectrum-modulated signal. The inversely spread reception signal is input to a demodulator 1514 through a BPF (Band Pass Filter) 1513, and a carrier wave is removed from the reception signal to obtain a baseband signal. The reception signal is then sent to the speech processor 1303 (or 1403).

A synchronization circuit 1515 attains synchronization between the reception signal and the spread code, and supplies a synchronization establishment signal to the control unit 1305 (or 1406) when the synchronization is attained.

In this manner, the spread code generators 1505 and 1512 are controlled by the control unit 1305 (or 1406), and generate designated spread codes, as needed.

Figure 16:
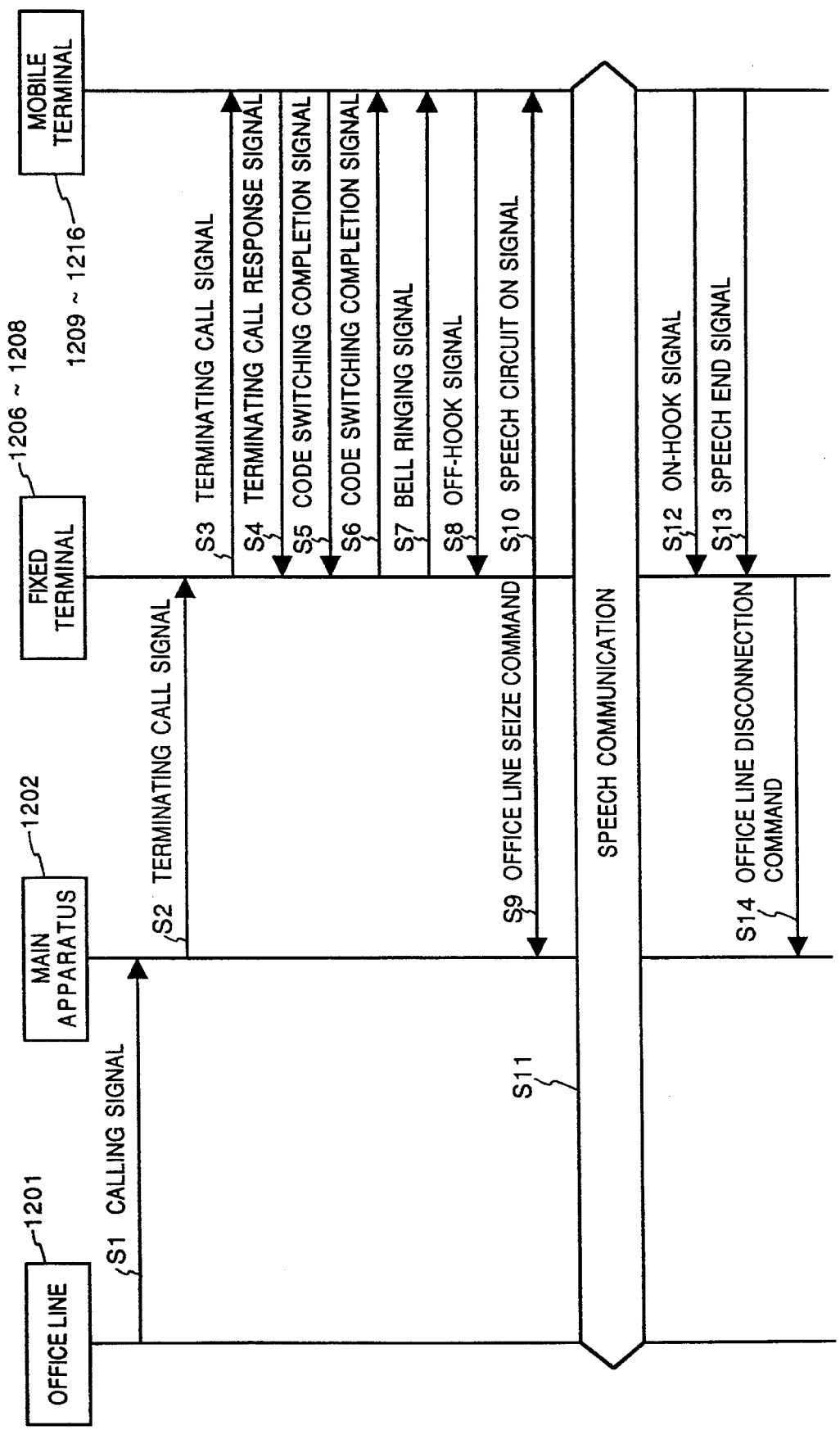
FIG. 16 is a call termination sequence chart of the telephone exchange system of the sixth embodiment.

FIG. 16 shows a call termination sequence from an office line in the telephone exchange system of this embodiment. When a calling signal S1 is input from the office line 1201 to the main apparatus 1202, the CPU 1221 of the main apparatus 1202 looks up the spread code use condition table 1223 to retrieve an unused spread code in the system. When the CPU can find the unused spread code, it determines the code as a spread code. The CPU 1221 multiplexes a code designation signal for designating the determined spread code on a terminating call signal S2, and supplies the multiplexed signal to one of the fixed terminals 1206 to 1208. Note that the CPU 1221 records, in the spread code use condition table 1223, a message indicating that the spread code determined to be used is in use, thereby managing whether or not spread codes are in use.

Upon reception of the terminating call signal S2 transmitted from the main apparatus 1202, one of the fixed terminals 1206 to 1208 spreads a terminating call signal S3, on which a code designation signal for designating the same spread code as that on the terminating call signal S2 is multiplexed, using a control spread code stored in advance in the ROM 1307, and transmits the spread signal to the corresponding one of the mobile terminals 1209 to 1216.

One of the mobile terminals 1209 to 1216, which received the terminating call signal S3, demodulates the terminating call signal S3, and reads out the designated spread code from the ROM 1407. The mobile terminal spreads a call termination response signal S4 and a code switching completion signal S5 using the designated spread code, and transmits the spread signals to the corresponding one of the fixed terminals 1206 to 1208.

One of the fixed terminals 1206 to 1208, which received the code switching completion signal S5, similarly spreads a code switching completion signal S6 and a bell ringing signal S7 using the designated spread code, and transmits these signals to the corresponding mobile terminal.

Upon reception of the bell ringing signal S7, one of the mobile terminals 1209 to 1216 rings a bell. When one of the mobile terminals 1209 to 1216 is set in an off-hook state, it transmits an off-hook signal S8 to the corresponding one of the fixed terminals 1206 to 1208. The corresponding one of the fixed terminals 1206 to 1208, which received the off-hook signal S8, sends a speech circuit ON signal S10 to the corresponding one of the mobile terminals 1209 to 1216, and sends an office line seize command S9 to the main apparatus 1202.

When one of the mobile stations 1209 to 1216 is set in an on-hook state, it transmits an on-hook signal S12 and a speech end signal S13 to the corresponding one of the fixed terminals 1206 to 1208. Upon reception of the speech end signal S13, the corresponding one of the fixed terminals 1206 to 1208 transmits an office line disconnection command S14 to the main apparatus 1202 to end a speech communication S11.

FIG. 17 shows a call generation sequence to an office line in the system of this embodiment.

When one of the mobile terminals 1209 to 1216 is set in an off-hook state, it transmits a call generation signal H1 a corresponding one of the fixed terminals 1206 to 1208. The call generation signal H1 is spread using the control spread code stored in the ROM 1407, and the spread signal is transmitted. Upon reception of the call generation signal H1, the corresponding one of the fixed terminals 1206 to 1208 inversely spreads the reception signal using the control spread code to demodulate it. Thereafter, the fixed terminal sends a code retrieval command H2 to the main apparatus 1202 to retrieve an unused spread code in the system from the spread code use condition table 1223, and to determine a spread code to be used.

Upon reception of the code retrieval command H2, the main apparatus 1202 determines a spread code to be used, and sends a code designation signal H3 to the corresponding one of the fixed terminals 1206 to 1208. Upon reception of the code designation signal H3, the corresponding one of the fixed terminals 1206 to 1208 spreads a code designation signal H4 using the control spread code, and transmits the spread signal to one of the mobile terminals 1209 to 1216. One of the mobile terminals 1209 to 1216, which received the code designation signal H4, demodulates the reception signal using the control spread code, and spreads a code switching completion signal H5 using the spread code designated by the code designation signal H4. The mobile terminal then transmits the spread signal to the corresponding one of the fixed terminals 1206 to 1208.

Upon reception of the code switching completion signal H5, the corresponding one of the fixed terminals 1206 to 1208 similarly transmits a code switching completion signal H6 to one of the mobile terminals 1209 to 1216, and subsequently transmits a speech circuit ON signal H7 to the mobile terminal. On the other hand, the fixed terminal transmits an office line seize command H8 to the main apparatus 1202. When an office line is seized, a dial tone is received (H9).

One of the mobile terminals 1209 to 1216 sends a dial signal H10 to a called party through the seized office line, and when the called party responds, a speech communication state (H11) is set. Thereafter, signals H12 and H13 and a command H14 are the same as the signals S12 and S13 and the command S14.

In the block diagram of the system shown in FIG. 12, the main apparatus 1202 and the fixed terminals 1206 to 1208 are handled as separate apparatuses. However, the fixed terminals 1206 to 1208 may be incorporated in the main apparatus 1202. A transmission signal and a reception signal between the fixed terminal and the mobile terminal are signals in different frequency bands.

Figure 18:
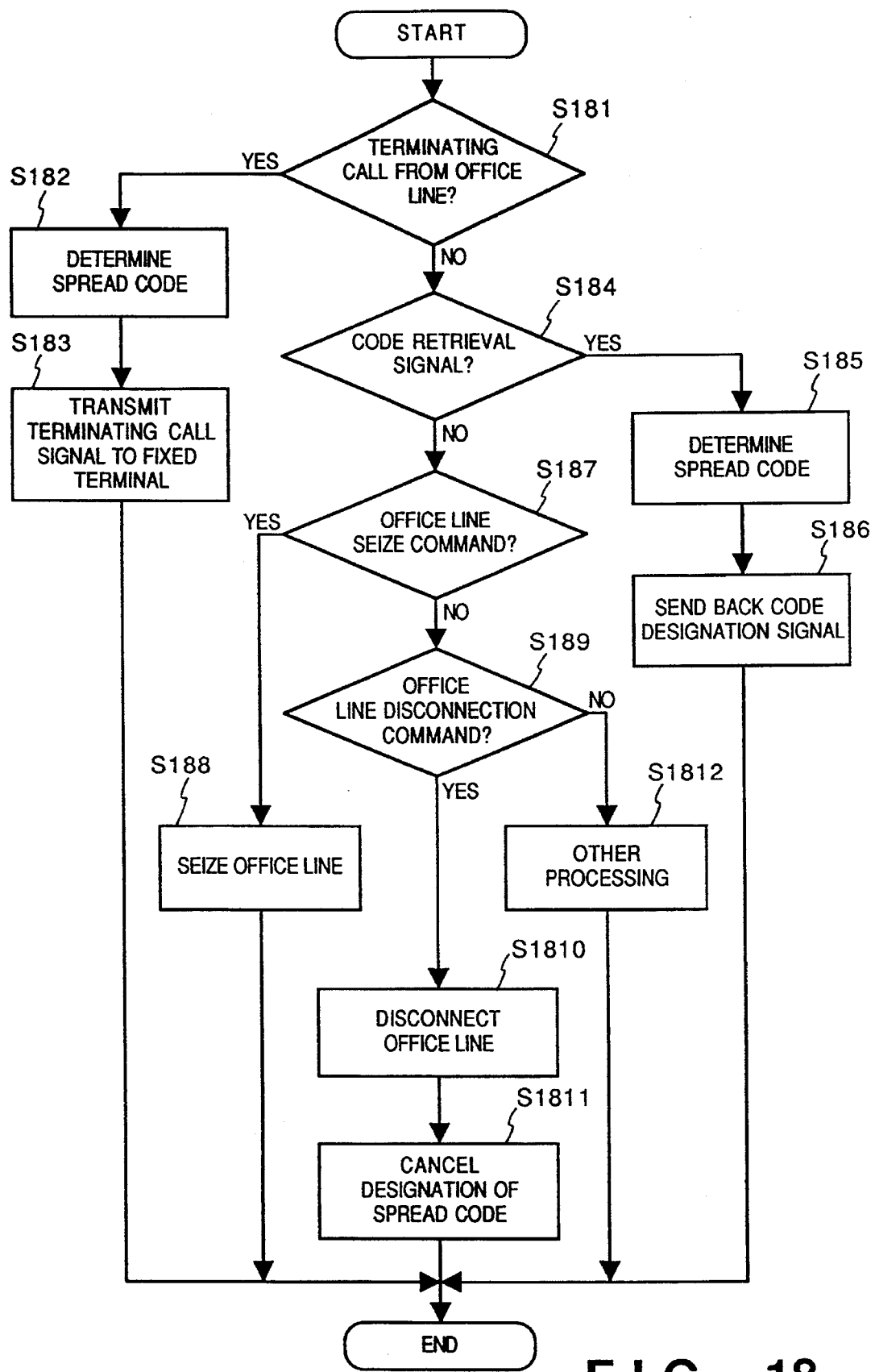
FIG. 18 is a flow chart of a main apparatus of the telephone exchange system of the sixth embodiment.
Figure 19:
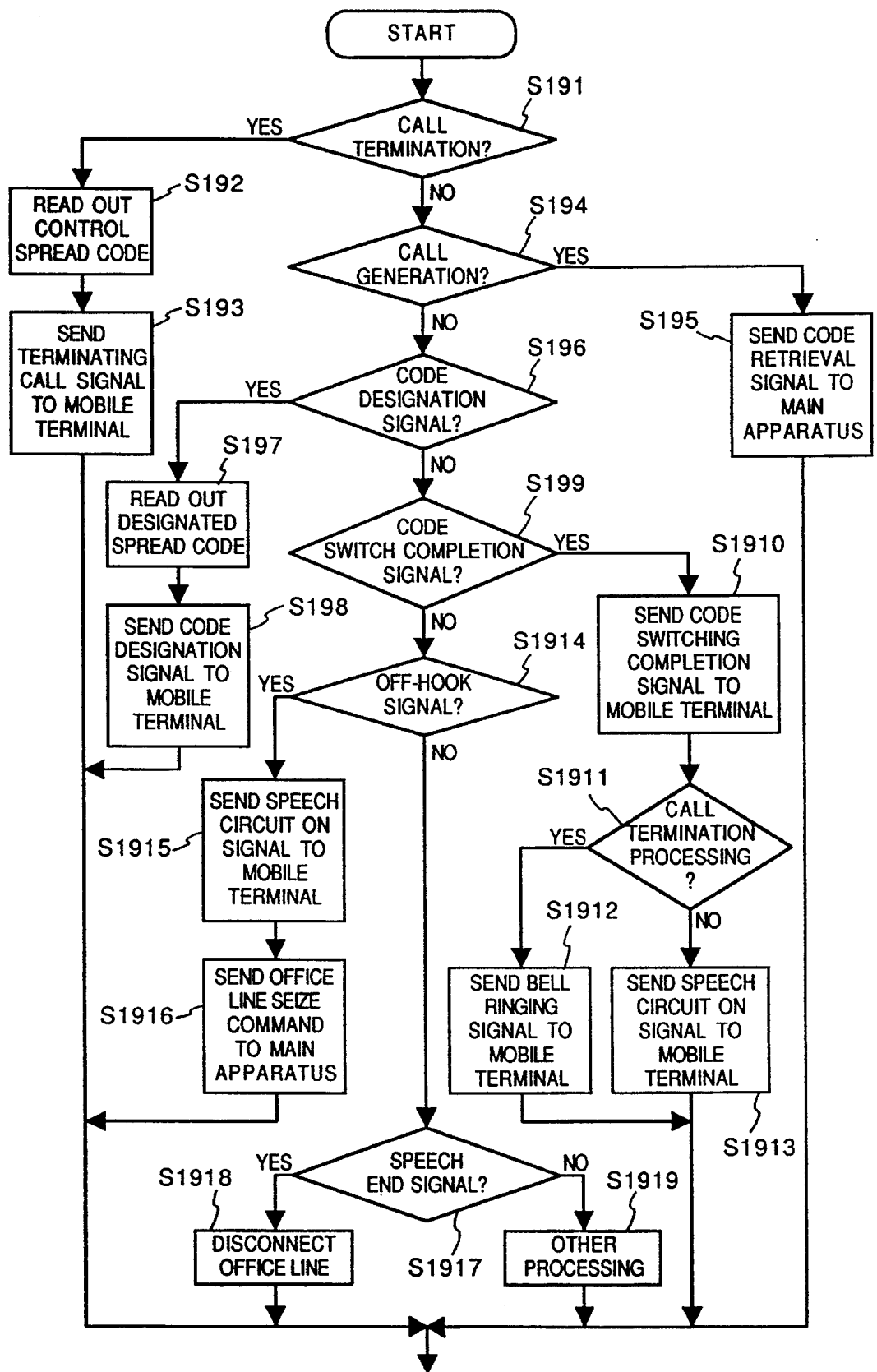
FIG. 19 is a flow chart of the fixed terminal of the telephone exchange system of the sixth embodiment.
Figure 20:
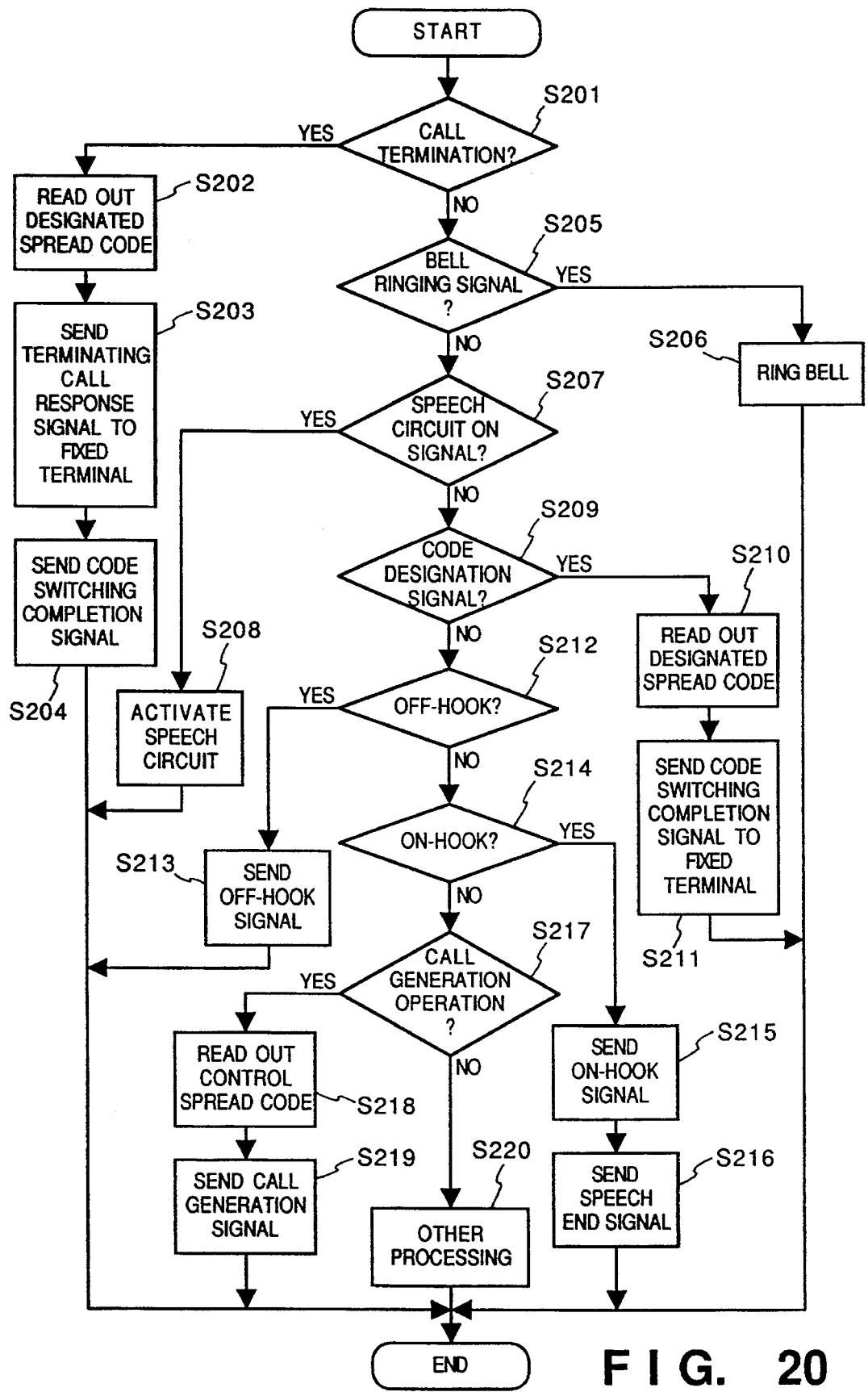
FIG. 20 is a flow chart of the mobile terminal of the telephone exchange system of the sixth embodiment.
Figure 21:
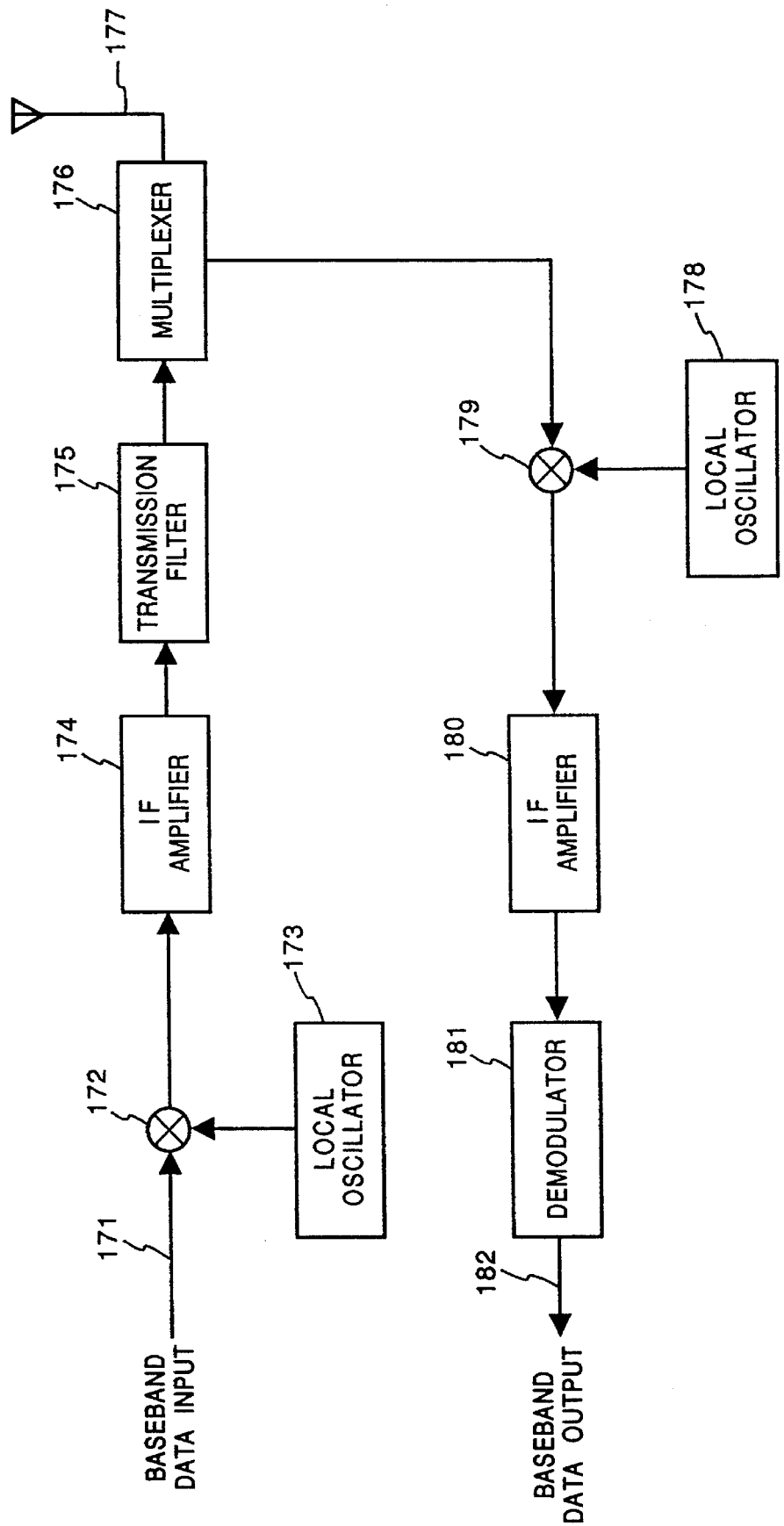
FIG. 21 is a block diagram showing the arrangement of a data conversion apparatus of a conventional telephone exchange system.

The above-mentioned call generation and call termination procedures will be described below in units of the main apparatus, the fixed terminal, and the mobile terminal with reference to the flow charts. FIGS. 18 to 20 show the processing sequences of the main apparatus, the fixed terminal, and the mobile terminal, respectively. A description will be made with reference to the flow chart shown in FIG. 18. This flow chart shows the sequence of the program executed by the CPU 1221, and the program is stored in the memory 1222.

Upon detection of a terminating call signal from the office line 1201, the CPU 1221 of the main apparatus 1202 looks up the spread code use condition table 1223 in the memory 1222 to select one of unused spread codes (S182). Subsequently, the CPU transmits a terminating call signal on which a number for specifying the selected spread code is multiplexed to a corresponding one of the fixed terminals 1206 to 1208 (S183). In this embodiment, a spread code is specified by a specific number assigned to each spread code.

Upon reception of a call generation signal from one of the mobile terminals 1209 to 1216 by receiving a code retrieval signal from the corresponding one of the fixed terminals 1206 to 1208, the CPU looks up the spread code use condition table 1223 in the memory 1222 to select one of unused spread codes (S185). Subsequently, the CPU transmits a code designation signal on which a number of the selected spread code is multiplexed to the fixed terminal as a transmission source (S186).

When the spread code is selected in step S182 or S185, a message indicating that the selected code is in use is registered in the use condition table 1223.

When one of extensions responds upon call termination, or when a called party connected to the office line responds upon call generation, a fixed terminal connected to the mobile terminal, which responded, transmits an office line seize command to the main apparatus. Upon reception of the office line seize command, the CPU 1221 seizes an office line (S188), thus connecting the extension to a communication destination at the office line.

When a speech communication is ended, the fixed terminal transmits an office line disconnection command to the main apparatus. Upon reception of the office line disconnection command (S189), the CPU 1221 releases the office line used by the fixed terminal as the transmission source (S1810), and also cancels the designation of the spread code used by the fixed terminal (S1811). More specifically, the use condition of the spread code is registered as "unused" in the use condition table 1223 (S1811).

A description will be made below with reference to the flow chart shown in FIG. 19. This flow chart shows a control sequence by the control unit 1305 of one of the fixed terminals 1206 to 1208, and is stored in the ROM 1307.

In a standby state, the control unit 1305 detects a terminating call signal from an office line or an extension through the line interface 1302, and also detects a call generation signal through the transmitter/receiver unit 1304 and the modem 1306. In the standby state, the control unit 1305 reads out a control spread code from the ROM 1307 and sets the readout code in the spread code generator 1512 so as to detect a call generation signal from the mobile terminal through the transmitter/receiver unit 1304. The call generation signal is inversely spread using the control spread code generated by the generator 1512.

When a terminating call signal from an office line or an extension is informed by a calling signal from the main apparatus 1202 together with a number of the selected spread code (S191), the control unit 1305 reads out the control spread code (may be different from the control spread code for inverse spread) from the ROM 1307, and sets the readout code in the spread code generator 1505 (S192). Furthermore, the control unit 1305 inputs the terminating call signal including the number of the selected spread code to the transmitter/receiver 1304 through the modem 1306 to spread the terminating call signal, and transmits the spread signal from the antenna 1309 (S193).

On the other hand, when the modem 1306 detects a call generation signal from one of the mobile terminal 1209 to 1216 during inverse spread of an upstream frequency band (which does not overlap a downstream frequency band) using the control spread code (S194), the control unit sends a code retrieval command for spreading the signal to the main apparatus 1202 to cause the apparatus to retrieve an unused spread code (S195).

Upon reception of a code designation signal as a response to the code retrieval command from the main apparatus (S196), the control unit 1305 reads out a spread code designated by the signal from the ROM 1307, and sets the readout code in the spread code generator 1512 (S197). In order to inform the code, the control unit 1305 sets the control spread code in the spread code generator 1505 to spread the code designation signal, and sends the spread signal to the mobile terminal as a call generation source (S198).

Upon reception of a signal indicating that the setting operation of the designated spread code is completed, the control unit 1305 sends a code switching completion signal as a response (S1910). The control unit 1305 determines the following processing depending on whether call generation processing or call termination processing is performed (S1911). If the call termination processing is to be performed, the control unit 1305 sends a bell ringing signal to the mobile terminal (S1912); if the call generation processing is to be performed, the control unit 1305 sends a speech circuit ON signal to the mobile terminal (S1913).

Upon reception of an off-hook signal from the mobile terminal (S1914), the control unit 1305 sends a speech circuit ON signal to the mobile terminal (S1915), and subsequently sends an office line seize command to the main apparatus to seize the line (S1916).

When a speech communication is ended, and a speech end signal is received from the mobile terminal (S1917), the control unit 1305 issues an office line disconnection command to the main apparatus 1202 to disconnect the line (S1918). Upon reception of other signals, the control unit 1305 performs processing according to the reception signal (S1919) although not shown.

A description will be made below with reference to the flow chart shown in FIG. 20. This flow chart shows a control sequence by the control unit 1406 of each of the mobile terminals 1209 to 1216, and is stored in the ROM 1407.

In a standby state, the control unit 1406 of each of the mobile terminals 1209 to 1216 detects a terminating call signal through the transmitter/receiver unit 1404 and the modem 1408, and issues a call generation signal through the key pad 1409. In the standby state, the control unit 1406 reads out a control spread code from the ROM 1407, and sets the readout code in the spread code generator 1512 to inversely spread the reception signal in the downstream frequency band.

When the terminating call signal is detected by the modem 1408, the control unit 1406 reads out a spread code from the ROM 1407 on the basis of a number for designating the spread code included in the terminating call signal, and sets the readout code in the spread code generator 1505 (S202). The control unit 1406 spreads a terminating call response signal and a code switching completion signal through the modem 1408, and sends the spread signals onto an upstream frequency band (S203 and S204).

The control unit 1406 similarly reads out a control spread code from the ROM 1407, and sets the readout code in the spread code generator 1512 to prepare for control signals from the fixed terminals 1206 to 1208.

Upon reception of a bell ringing signal from the fixed terminal (S205), the control unit 1406 rings a bell (S206). Upon reception of a speech circuit ON signal (S207), the control unit 1406 activates a speech circuit to start a speech communication (S208).

Upon reception of a code designation signal from the fixed terminal (S209), the control unit 1406 reads out a spread code from the ROM 1407 on the basis of a number for designating the spread code included in the code designation signal, and sets the readout code in the spread code generator 1505 (S210) in the same manner as in reception of the terminating call signal. The control unit 1406 spreads a code switching control signal through the modem 1408, and sends the spread signal on the upstream frequency band (S211). When the main apparatus determines that there is no unused spread code, the main apparatus sends a busy signal in place of the code designation signal via the fixed terminal. The control unit 1406 of the fixed terminal spreads the busy signal using the control spread code, and sends the spread signal to the mobile terminal. Upon reception of this signal, the mobile terminal generates a busy tone to inform the busy state to an operator.

The above-mentioned processing is performed for signals received from the fixed terminal, and processing in step S212 and subsequent steps is performed based on operations by an operator.

When an off-hook operation is performed (S212), the control unit sends 1406 an off-hook signal to the fixed terminal as a communication destination (S213); when an on-hook operation is performed (S214), the control unit 1406 sends an on-hook signal and a speech end signal to the fixed terminal (S215 and S216).

When a call generation instruction is input at the key pad 1409 (S217), the control unit 1406 reads out a control spread code from the ROM 1407, and sets the readout code in the spread code generator 1505 (S218). The control unit then transmits a call generation signal onto the upstream frequency band through the modem 1408 (S219). Thereafter, the control unit 1406 sets the control spread code in the spread code generator 1512, and waits for a response from a corresponding one of the fixed terminals 1206 to 1208.

As described above, since the main apparatus manages spread codes in this embodiment, the limited number of spread codes can be effectively used.

More specifically, the number of spread codes suitable for a multiple access by code division is small. For this reason, if spread codes are permanently assigned to fixed terminals in the exchange system, only the fixed terminals corresponding in number to available spread codes can be arranged. In this embodiment, since a spread code is dynamically assigned to each fixed terminal in a speech communication, the fixed terminals more than available spread codes can be arranged in the system.

Note that the control spread code of the transmitter unit of each of the fixed terminals 1206 to 1208 must be the same as the control spread code of the receiver unit of each of the mobile terminals 1209 to 1216, and the control spread code of the receiver unit of each of the fixed terminals 1206 to 1208 must be the same as the control spread code of the transmitter unit of each of the mobile terminals 1209 to 1216. However, the transmitter and receiver units of each of the fixed terminals 1206 to 1208, and the transmitter and receiver units of each of the mobile terminals 1209 to 1216 need not have the same control spread codes. The same applies to a spread code designated for a speech communication.

A control spread code may be switched to a designated spread code before or after a code switching completion signal spread by the control spread code is transmitted. That is, the designated spread code need only be switched before a speech communication.

As described above, in this embodiment, the fixed terminals 1206 to 1208 and the mobile terminals 1209 to 1216 inversely spread signals using the control spread code in the standby state. Thus, when a call is generated, the fixed terminal spreads a number of a speech communication spread code selected by the main apparatus 1202 using the control spread code, and informs the number to the corresponding mobile terminal. After the control spread code is switched to the speech communication spread code before a speech communication is started, a speech communication is started. The same applies to a case wherein a call is generated at the mobile terminal.

When a call generated by a set of the fixed and mobile terminals transits to a speech communication state, the remaining ready fixed and mobile terminals can perform communications using the control spread code, and can connect other calls using other speech communication spread codes.

The present invention is not limited to the above embodiments and various changes and modifications can be made within the spirit and scope of the present invention. Therefore, to apprise the public of the scope of the present invention, the following claims are made.

What is claimed is:

1. A spread spectrum communication apparatus comprising:

generation means for generating a plurality of different spread codes in parallel;

modulation means for modulating transmission information of parallel bits using the plurality of spread codes generated by said generation means; and transmission means for transmitting the transmission information modulated by said modulation means, wherein said modulation means modulates each bit of the parallel bits using each of the plurality of spread codes in parallel.

2. The apparatus according to claim 1, wherein said generation means comprises a plurality of delay means having different delay times, and supplies a common spread code to said plurality of delay means to generate a plurality of spread codes having different phases.

3. The apparatus according to claim 1, wherein said generation means further generates a synchronization spread code, and said transmission means multiplies the signal accumulated by said accumulation means with the synchronization spread code generated by said generation means, and transmits the product signal.

4. The apparatus according to claim 3, wherein said generation means generates the synchronization spread code having the same length as that of the plurality of spread codes.

5. The apparatus according to claim 1, further comprising conversion means for converting serial data into parallel data, and wherein said modulation means modulates parallel data converted by said conversion means.

6. The apparatus according to claim 1, further comprising conversion means for converting serial transmission information into the transmission information of the parallel bits.

7. A spread spectrum communication apparatus comprising:

reception means for receiving a reception signal;

generation means for generating a plurality of different despread codes in parallel;

demodulation means for demodulating the reception signal using the plurality of despread codes generated by said generation means, respectively; and conversion means for converting the reception signal demodulated by said demodulation means into parallel bits.

8. The apparatus according to claim 7, wherein said generation means comprises a plurality of delay means having different delay times, and supplies a common inverse spread code to said plurality of delay means to generate a plurality of inverse spread codes having different phases.

9. The apparatus according to claim 7, wherein said generation means comprises means for generating a synchronization spread code in synchronism with the plurality of inverse spread codes, and correlation means for checking a correlation between the synchronization spread code and a reception signal, and generates the plurality of inverse spread codes according to the correlation between the synchronization spread code and the reception signal.

10. The apparatus according to claim 9, wherein said generation means generates the synchronization spread code having the same length as that of the plurality of inverse spread codes.

11. The apparatus according to claim 7, further comprising conversion means for converting parallel data into serial data, said conversion means converting a parallel signal demodulated by said demodulation means into a serial signal.

12. A spread spectrum transmission apparatus comprising:

generation means for generating a plurality of spread codes;

demultiplexing means for demultiplexing transmission information, generated by multiplexing data from a plurality of channels, to data from each of the plurality of channels;

spread means for spreading the data from each of the plurality of channels demultiplexed by said demultiplexing means on the basis of the plurality of spread codes generated by said generation means; and transmission means for transmitting the data from the plurality of channels spread by said spread means.

13. The apparatus according to claim 12, further comprising conversion means for converting serial transmission information into the transmission information consisting of the plurality of bits.

14. The apparatus according to claim 12, wherein said demultiplexing means demultiplexes information from a digital network.

15. The apparatus according to claim 12, wherein said demultiplexing means demultiplexes information from a digital terminal.

16. A spread spectrum reception apparatus comprising:

reception means for receiving a reception signal;

generation means for generating a plurality of despread codes;

a plurality of despread means for despreading the reception signal on the basis of the plurality of despread codes generated by said generation means, respectively;

supply means for supplying the reception signal to said plurality of despread means; and conversion means for converting a plurality of outputs of the plurality of despread means into parallel data.

17. The apparatus according to claim 16, wherein said supply means supplies the reception signal to the plurality of despread means in parallel.

18. A spread spectrum communication apparatus comprising:

first generation means for generating a first spread code;

a plurality of delay means for delaying the first spread code to generate a plurality of spread codes having different phases;

modulation means for modulating transmission information signals of a plurality of parallel channels using the plurality of spread codes generated by said plurality of delay;

accumulation means for accumulating the signals of the channels modulated by said modulation means;

second generation means for generating a second spread code;

multiplication means for multiplying a signal accumulated by said accumulation means with the second spread code generated by said second generation means; and transmission means for transmitting the signal multiplied by said multiplication means.

19. A spread spectrum communication apparatus comprising:

first generation means for generating a first inverse spread code;

second generation means for generating a second inverse spread code;

correlation means for checking a correlation between the second inverse spread code and a reception signal;

third generation means for delaying the first inverse spread code according to the correlation between the second inverse spread code and the reception signal to generate a plurality of inverse spread codes having different phases; and modulation means for parallelly modulating the reception signal using the plurality of inverse spread codes generated by said third generation means.

20. A telephone exchange system having an extension connected by radio, comprising:

reception means for receiving a signal from a terminal;

demodulation means for despreading the signal received by said reception means to demodulate the signal into a speech signal;

exchange means for exchanging the speech signal demodulated by said demodulation means;

transmission means for transmitting the speech signal exchanged by said exchange means to a communication partner; and control means for controlling said exchange means on the basis of the signal received by said reception means.

21. The system according to claim 20, wherein said demodulation means despreads the reception signal using a plurality of inverse spread codes.

22. The system according to claim 21, wherein said demodulation means converts the data despread by the plurality of inverse spread codes into serial data, and outputs the serial data.

23. The system according to claim 21, wherein said demodulation means converts the data despread by the plurality of inverse spread codes into Alternate Mark Inversion code data, and outputs the Alternate Mark Inversion code data.

24. A telephone exchange system having an extension connected by radio, comprising:

receiving means for receiving a speech signal from a communication partner;

exchange means for exchanging the speech signal received by said receiving means;

spread means for spreading the speech signal exchanged by said exchange means; and transmission means for transmitting the signal spread by said means to a terminal.

25. The system according to claim 24, wherein said transmission means spreads the speech signal using a plurality of spread codes.

26. The system according to claim 25, wherein said transmission means converts the speech signal into parallel data, and spreads channels of the parallel data using a plurality of different spread codes, respectively.

27. The system according to claim 25, wherein said transmission means demultiplexes a speech signal coded by Alternate Mark Inversion in units of channels, and spreads the demultiplexed data using different spread codes in units of channels.

28. A telephone exchange system having an extension connected by radio, comprising:

reception means for receiving a signal;

demodulation means for despreading the signal received by said reception means to demodulate the signal into a speech signal;

exchange means for exchanging the speech signal;

control means for controlling said exchange means on the basis of the signal received by said reception means;

spread means for spreading the speech signal exchanged by said exchange means; and transmission means for transmitting the signal spread by said spread means.

29. A telephone exchange system connected to a plurality of mobile terminals by radio, comprising:

selection means for selecting one of a plurality of spread codes;

information means for informing the spread code selected by said selection means to one of the plurality of mobile terminals by radio;

demodulation means for despreading the signal from the mobile terminal informed by said information means in accordance with the spread code selected by selection means to demodulate the signal into a speech signal; and transmission means for transmitting the speech signal to a communication partner.

30. The system according to claim 29, wherein said selection means comprises storage means for storing use conditions of the plurality of spread codes, and looks up said storage means to select an unused spread code.

31. A telephone exchange system connected to a plurality of mobile terminals by radio, comprising:

selection means for selecting one of a plurality of spread codes;

receiving means for receiving a speech signal from a communication partner;

exchange means for exchanging the speech signal received by said receiving means;

modulation means for modulating the speech signal exchanged by said exchange means in accordance with the spread code selected by said selection means; and transmission means for transmitting the signal modulated by said modulation means.

32. A spread spectrum communication apparatus comprising:

storage means for storing a plurality of sets of spread codes;

selection means for selecting one set of the plurality of sets of spread codes stored in said storage means; and communication means for performing a communication on the basis of the set of spread codes selected by said selection means.

33. The apparatus according to claim 32, wherein said selection means comprises reception means for receiving a selection signal for selecting one set of the plurality of sets of spread codes.

34. The apparatus according to claim 32, wherein said selection means comprises second storage means for storing data indicating whether or not each of the plurality of sets of spread codes is in use, and selects a spread code, corresponding data of which is stored in said second storage means to indicate that the spread code is not in use.

35. A spread spectrum transmission apparatus comprising:

generation means for generating a plurality of different spread codes in parallel corresponding to parallel bits of transmission information;

a plurality of modulation means for modulating parallel bits of transmission information using spread codes generated by said generation means;

transmission means for transmitting output of said plurality of modulation means;

wherein each of said plurality of modulation means modulates each bit of the parallel bits of transmission information using each of the plurality of spread codes.

36. A spread spectrum communication apparatus comprising:

reception means for receiving a reception signal;

generation means for generating a plurality of different despread codes in parallel;

demodulation means for demodulating the reception signal using the plurality of despread codes generated by said generation means, to output a plurality of demodulated signals corresponding to the plurality of despread codes;

multiplexing means for multiplexing the plurality of demodulated signals demodulated by said demodulation means to output a multiplexed signal; and transmission means for transmitting the multiplexed signal multiplexed by said multiplexing means via a digital signal line.

37. The apparatus according to claim 36, wherein said transmission means transmits the multiplexed signal to a digital network via the digital signal line.

38. The apparatus according to claim 36, wherein said transmission means transmits the multiplexed signal to a digital terminal via the digital signal line.

* * * * *

UNITED STATES PATENT AND TRADEMARK OFFICE
CERTIFICATE OF CORRECTION

PATENT NO. : 5,467,367
DATED : November 14, 1995
INVENTOR(S) : MICHIRO IZUMI ET AL.

It is certified that error appears in the above-indentified patent and that said Letters Patent is hereby corrected as shown below:

TITLE PAGE:

AT [56] REFERENCES CITED

United States Patent Document insert:
--5,177,767  1/1993  Kato
  5,228,055  7/1993  Uchida et al.
  5,235,612  8/1993  Stilwell et al.
  5,235,614  8/1993  Bruckert et al.

COLUMN 9

Line 67, "are the" should read --are then--.

COLUMN 22

Line 40, "delay;" should read --delay means;--.

COLUMN 23

Line 38, "means" should read --spread means--.

UNITED STATES PATENT AND TRADEMARK OFFICE
CERTIFICATE OF CORRECTION

PATENT NO. : 5,467,367
DATED : November 14, 1995
INVENTOR(S) : MICHIRO IZUMI ET AL.

It is certified that error appears in the above-indentified patent and that said Letters Patent is hereby corrected as shown below:

COLUMN 24

```
Line 22,   "partner:" should read --partner;--;
Line 57,   "means;"   should read --means; and--.
```

Signed and Sealed this

Fourteenth Day of May, 1996

Attest:

BRUCE LEHMAN

Attesting Officer   Commissioner of Patents and Trademarks